United States Patent
Cvek

(10) Patent No.: US 7,665,709 B2
(45) Date of Patent: Feb. 23, 2010

(54) TROLLEY AND RAIL SYSTEMS FOR EXTENSION AND RETRACTION ARRANGEMENTS

(76) Inventor: Sava Cvek, 40 Woodland Rd., Jamaica Plain, MA (US) 02130

( * ) Notice: Subject to any disclaimer, the term of this patent is extended or adjusted under 35 U.S.C. 154(b) by 558 days.

(21) Appl. No.: 11/152,952

(22) Filed: Jun. 14, 2005

(65) Prior Publication Data

US 2006/0102812 A1    May 18, 2006

Related U.S. Application Data

(60) Provisional application No. 60/521,660, filed on Jun. 14, 2004, provisional application No. 60/668,423, filed on Apr. 5, 2005.

(51) Int. Cl.
| F16M 1/00 | (2006.01) |
|---|---|
| F16M 3/00 | (2006.01) |
| F16M 5/00 | (2006.01) |
| F16M 7/00 | (2006.01) |
| F16M 9/00 | (2006.01) |
| F16M 11/00 | (2006.01) |
| A47G 29/00 | (2006.01) |

(52) U.S. Cl. ............... 248/669; 108/25; 108/50.02; 108/50.01; 248/651; 248/27.1; 312/223.3; 312/312; 312/196; 312/306

(58) Field of Classification Search ............. 248/651, 248/669, 27.1; 108/25, 50.01, 50.02; 312/223.3, 312/312, 196, 306
See application file for complete search history.

(56) References Cited

U.S. PATENT DOCUMENTS

| 2,105,972 | A | | 1/1938 | Hagenbook |
|---|---|---|---|---|
| 2,789,861 | A | | 4/1957 | Hudson |
| 2,861,857 | A | * | 11/1958 | Lee et al. ................ 312/312 |
| 3,451,507 | A | | 6/1969 | Santos |
| 3,761,152 | A | | 9/1973 | Cory |
| 3,925,918 | A | | 12/1975 | Pelin |
| 4,065,194 | A | * | 12/1977 | Mattia ................. 312/247 |
| 4,690,466 | A | | 9/1987 | Bakr et al. |
| 4,735,467 | A | * | 4/1988 | Wolters .................. 312/29 |
| 4,766,422 | A | * | 8/1988 | Wolters et al. ............ 312/198 |
| 4,828,342 | A | | 5/1989 | Stefan |
| 5,101,736 | A | | 4/1992 | Bommarito et al. |
| 5,173,686 | A | | 12/1992 | Fujihara |

(Continued)

OTHER PUBLICATIONS

Wood Technology, Inc, webpage screen shots, Jan. 17-18, 2006, 7 pgs, Wood Technology, Inc., Pittsboro, NC USA.

*Primary Examiner*—J. Allen Shriver, II
*Assistant Examiner*—Michael McDuffie
(74) *Attorney, Agent, or Firm*—O'Connell Law Firm

(57) ABSTRACT

A trolley and rail system for use in relation to an extension and retraction arrangement with a trolley structure retained for axial extension and retraction along a body portion of a rail arrangement comprising first and second rails disposed in substantially parallel spaced orientation. The trolley structure can have a central portion and first and second wing portions with load bearing wheels for rolling along rigid bearing surfaces of the first and second rails. The bearing surfaces and the wheels can have correspondingly contoured profiles. The trolley structure can have a ventrally disposed alcove. Constant force springs can assist in a travel of the trolley structure in relation to the rail arrangement. The trolley structure or a support arm coupled thereto can have threaded mounting holes for retaining a flat panel monitor.

22 Claims, 19 Drawing Sheets

U.S. PATENT DOCUMENTS

| | | |
|---|---|---|
| 5,273,352 A | 12/1993 | Saper |
| 5,321,579 A | 6/1994 | Brown et al. |
| 5,401,089 A | 3/1995 | Inagaki et al. |
| 5,437,235 A | 8/1995 | Randolph |
| 5,526,756 A | 6/1996 | Watson |
| 5,732,919 A * | 3/1998 | Rosen et al. ............. 248/274.1 |
| 5,797,666 A * | 8/1998 | Park ....................... 312/319.5 |
| 5,845,587 A | 12/1998 | Ditonto |
| 5,847,685 A | 12/1998 | Otsuki |
| 6,062,148 A | 5/2000 | Hodge et al. |
| 6,102,355 A | 8/2000 | Rood |
| 6,185,096 B1 | 2/2001 | Helot et al. |
| 6,318,048 B1 * | 11/2001 | Sambuca, Jr. ............. 53/136.4 |
| 6,352,226 B1 * | 3/2002 | Gordon ................... 248/125.2 |
| 6,381,128 B1 | 4/2002 | Kramer |
| 6,463,862 B1 | 10/2002 | Kuhlman et al. |
| 6,494,150 B1 * | 12/2002 | Phoenix et al. ............. 108/147 |
| 6,553,919 B1 | 4/2003 | Nevin |
| 6,609,465 B2 * | 8/2003 | Kolavo .................... 108/50.01 |
| 6,612,670 B2 | 9/2003 | Liu |
| 6,626,686 B1 | 9/2003 | D'Souza et al. |
| 6,733,094 B1 * | 5/2004 | Chang ....................... 312/7.2 |
| 6,754,070 B2 | 6/2004 | Chen |
| 6,783,105 B2 | 8/2004 | Oddsen |
| 6,832,822 B2 | 12/2004 | Canedy et al. |
| 6,883,759 B2 | 4/2005 | Park et al. |
| 6,902,243 B2 * | 6/2005 | Bober ....................... 312/306 |
| 6,913,332 B1 | 7/2005 | Besterfield et al. |
| 7,029,079 B2 | 4/2006 | Holt |
| 7,044,423 B2 * | 5/2006 | Bober et al. ............. 248/188.4 |
| 7,063,024 B2 * | 6/2006 | Latino .................... 108/50.01 |
| 7,128,003 B2 * | 10/2006 | Okninski .................... 108/147 |
| 7,178,469 B2 | 2/2007 | Goza |
| 2002/0101139 A1 | 8/2002 | Lee |
| 2004/0070319 A1 | 4/2004 | Miller |
| 2005/0056734 A1 | 3/2005 | Lee |
| 2005/0236527 A1 | 10/2005 | Takagi |

* cited by examiner

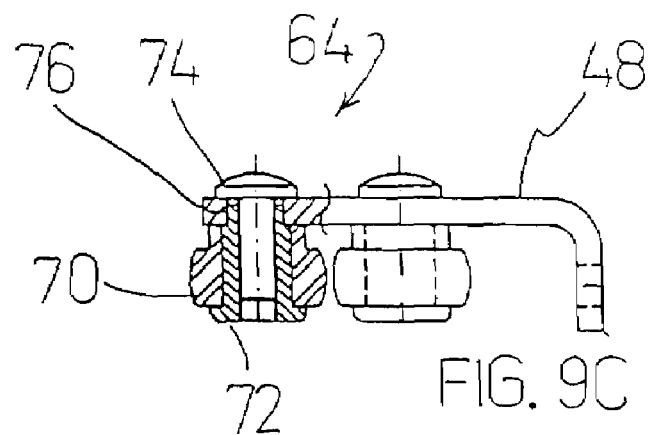
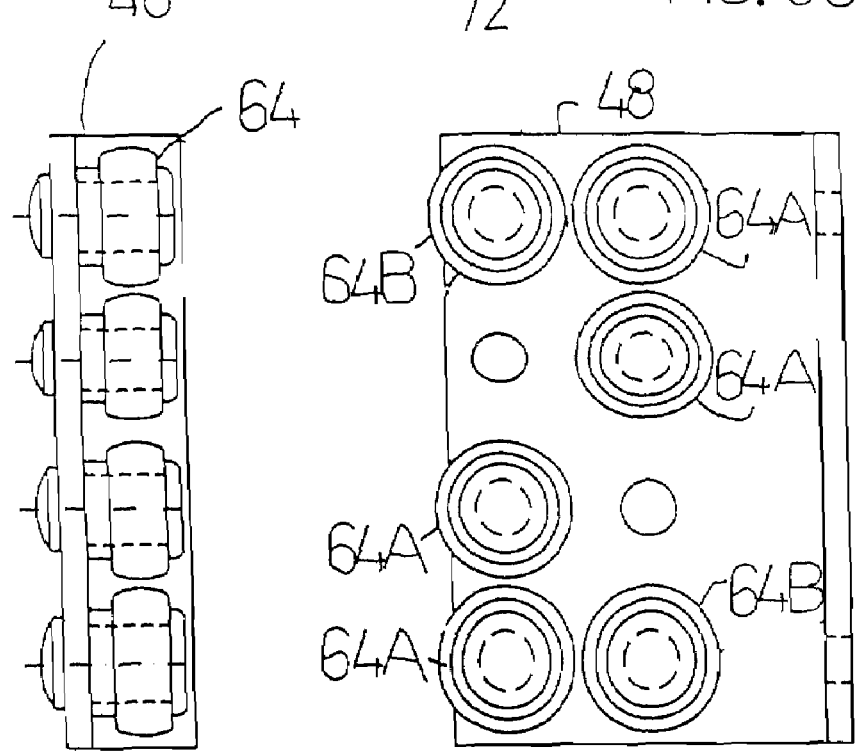
FIG. 9C
FIG. 9B
FIG. 9A

TROLLEY AND RAIL SYSTEMS FOR EXTENSION AND RETRACTION ARRANGEMENTS

FIELD OF THE INVENTION

The present invention relates generally to systems for supporting articles. More particularly, disclosed herein are trolley and rail systems for use in relation to extension and retraction arrangements for enabling an adjustment of a supported article, such as a computer, computer monitor, or other computer component, between extended and retracted configurations.

BACKGROUND OF THE INVENTION

Computers have become an integral part of our business and personal lives. The presence of a computer monitor, a keyboard, or a laptop or other computer component has come to be seen as a necessary evil for the accomplishment of one's daily tasks. With the computer components inherently come wires that further clutter work surfaces. Many computer components, particularly computer monitors, have achieved reduced size. However, when not in use, they remain as obstacles to the full usage of a work surface and contribute to a utilitarian and often displeasing appearance of the work surface and the office in general. Further, continuous exposure leaves the computer components vulnerable not only to environmental conditions but also to tampering and theft, particularly as the components become smaller, lighter, and more portable.

It would be advantageous, therefore, if one could enjoy full usage of a computer, computer component, or other article when desired while being able to make the article effectively disappear from a work surface when its presence is no longer necessary. A number of talented inventors have sought to provide mechanisms for enabling a manipulation of a computer or computer component, such as a monitor, between use and storage configurations. To date, however, the proposed solutions of the prior art, such as those disclosed in U.S. Pat. No. 5,526,756 to Watson, U.S. Pat. No. 6,494,150 to Phoenix et al., and U.S. Pat. No. 6,733,094 to Chang, have been bulky and inelegant, of limited effectiveness, and relatively complex in structure and operation. Furthermore, prior art mechanisms and furniture have been ill equipped to accommodate one another.

SUMMARY OF THE INVENTION

With an appreciation for the state of the art summarized above, the present inventor set forth with the basic object of providing an arrangement for enabling the extension and retraction of a supported article, such as a computer monitor, that overcomes the disadvantages exhibited by the prior art while providing a number of previously unrealized advantages thereover.

A more particular object of the invention is to provide an extension and retraction arrangement that enables a supported article to be disposed in an extended position for full usage thereof and in a retracted and unobtrusive storage position.

Another particular object of embodiments of the invention is to enable a supported article to be extended and retracted smoothly and without risk of damage to the article or an inadvertent retraction thereof.

A further object of embodiments of the invention is to provide an extension and retraction arrangement that is reliable, efficient, and elegant in construction and operation.

These and in all likelihood further objects and advantages of the present invention will become obvious not only to one who reviews the present specification and drawings but also to those who have an opportunity to experience an embodiment of the systems and arrangements disclosed herein. However, it will be appreciated that, although the accomplishment of each of the foregoing objects in a single embodiment of the invention may be possible and indeed preferred, not all embodiments will seek or need to accomplish each and every potential advantage and function. Nonetheless, all such embodiments should be considered within the scope of the present invention.

One will appreciate that the foregoing discussion broadly outlines the more important goals and features of the invention to enable a better understanding of the detailed description that follows and to instill a better appreciation of the inventor's contribution to the art. Before any particular embodiment or aspect thereof is explained in detail, it must be made clear that the following details of construction and illustrations of inventive concepts are mere examples of the many possible manifestations of the invention.

BRIEF DESCRIPTION OF DRAWINGS

In the accompanying drawing figures:

FIGS. 9A, 9B, and 9C comprise side, front, and top plan views of a portion of a trolley structure under the present invention;

DISCLOSURE OF PREFERRED EMBODIMENTS

The trolley and rail systems for use in the extension and retraction of supported articles disclosed herein are subject to a wide variety of embodiments. However, to ensure that one skilled in the art will be able to understand and, in appropriate cases, practice the present invention, certain preferred embodiments of the broader invention revealed herein are described below and shown in the accompanying drawing figures.

While a flat screen monitor is commonly depicted as the article to be supported and the article is commonly retained relative to a desk or similar structure, it is to be understood that other articles and support structures are contemplated within the scope of the invention. Furthermore, extension and retraction can be carried out manually by the user, by a motorized arrangement, or by any combination thereof. Therefore, before any particular embodiment of the invention is explained in detail, it must be made clear that the following details of construction and illustrations of inventive concepts are mere examples of the many possible manifestations of the invention.

Figure 1:
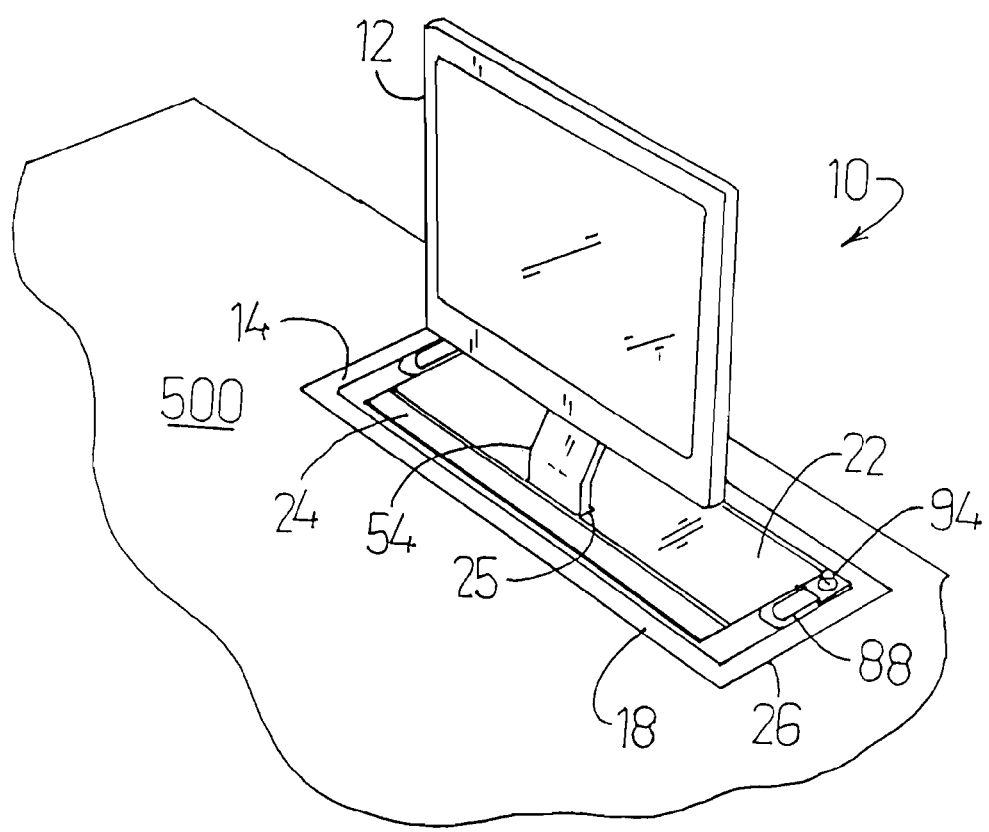
FIG. 1 is a perspective view of an extension and retraction arrangement pursuant to the invention disclosed herein in an extended configuration and retained in relation to a support structure.
Figure 2:
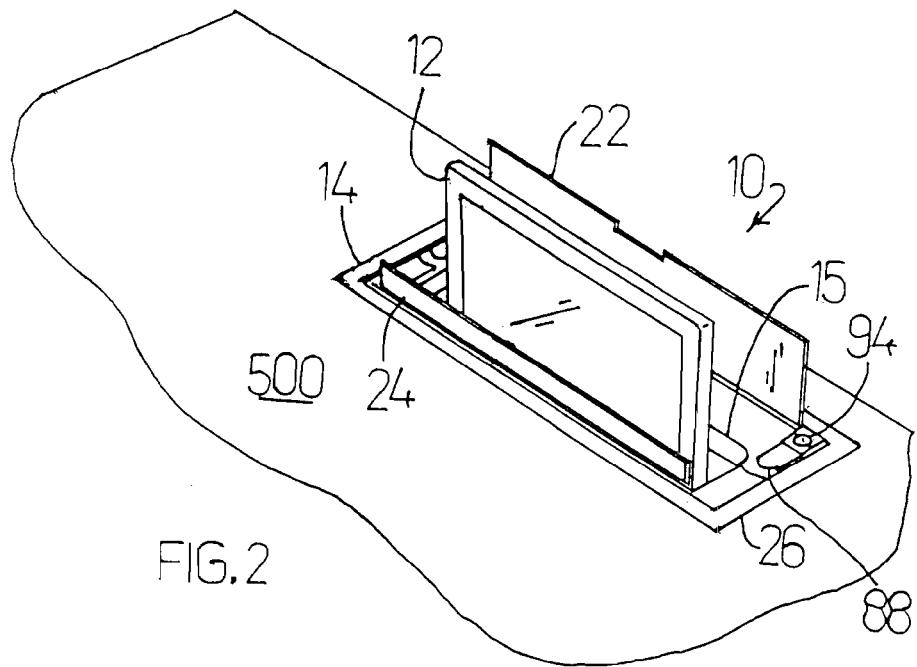
FIG. 2 is a perspective view of the extension and retraction arrangement of FIG. 1 in a partially extended configuration.
Figure 3:
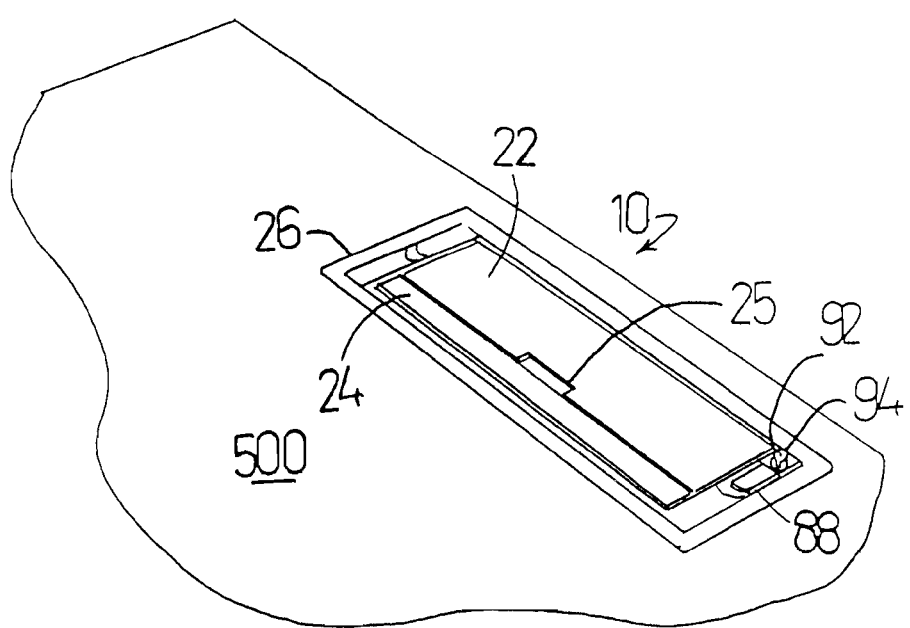
FIG. 3 is a perspective view of the extension and retraction arrangement of FIG. 1 in a retracted configuration.

Turning more particularly to the drawings, an embodiment of an extension and retraction arrangement pursuant to the present invention is indicated generally at 10 in FIGS. 1 through 3. In FIG. 1, a supported article, in this example a flat panel computer monitor 12, is shown in a fully extended position in relation to a support structure 500, which can comprise a desk. The monitor 12 is retained relative to a distal portion of a centrally disposed support arm 54. The support arm 54 supports the monitor 12 for extension and retraction through an aperture 15 in the support structure 500 by mechanisms described more fully hereinbelow.

The extension and retraction arrangement 10 has an upper framework 14. An upper flange 26 can be engaged with the upper framework 14 and can overly the surface of the support structure 500. First and second doors 22 and 24 can be pivotally coupled to the upper framework 14 to enable a pivoting between the closed configuration shown in FIGS. 1 and 3 and the open configuration depicted in FIG. 2. An arm aperture 25 can be provided in either or both of the doors 22 and 24, in this example just the first door 22, to enable the doors 22 and 24 to reach a fully closed configuration even while the monitor 12 and support arm 54 are fully extended. Advantageously, when the first and second doors 22 and 24 are pivoted to a closed configuration, the aperture 15 in the support structure 500 can be effectively sealed, and a generally continuous surface can be presented, whether below the monitor 12 as in FIG. 1 or above the monitor 12 as in FIG. 3.

Operation of the first and second doors 22 and 24 can be controlled by any effective means. In certain embodiments, for example, the first and second doors 22 and 24 can be spring loaded and latched by a latching means that enables an opening of the first and second doors 22 and 24 by a further depression of the doors 22 and 24 to release the latching means. Alternatively, as will be elaborated upon below, a trigger 88 can enable an automatic opening of the first and second doors 22 and 24 and, additionally or alternatively, a raising of the monitor 12 and the support arm 54. Operation of the trigger 88 can be controlled by a lock 94 that can be operated by a key 92, a keycard, or any other means.

Use of such an extension and retraction arrangement 10 can begin with the monitor 12 or other article retained below or within a surface of a support structure 500. The first and second doors 22 and 24 can be opened, such as by an actuation of the trigger 88. The support arm 54 and the retained monitor 12 can then rise through motorization, through mechanical forces, or, additionally or alternatively, by manual actuation by the user. By means disclosed herein, the monitor 12 and support arm 54 can be locked in a fully raised position. Then, the first and second doors 22 and 24 can, if necessary or desirable, be pivoted to a closed configuration as in FIG. 1. When the monitor 12 or other article is no longer needed, the doors 22 and 24 can be opened and the monitor 12 and support arm 54 can be retracted as in FIG. 2 by any suitable method including gravity, motorization, mechanical forces, manual actuation, or any combination thereof. Again by means disclosed herein, the monitor 12 and support arm 54 can potentially be locked in a retracted position and the first and second doors 22 and 24 can be manually or automatically pivoted to a closed configuration as in FIG. 3.

Figure 4:
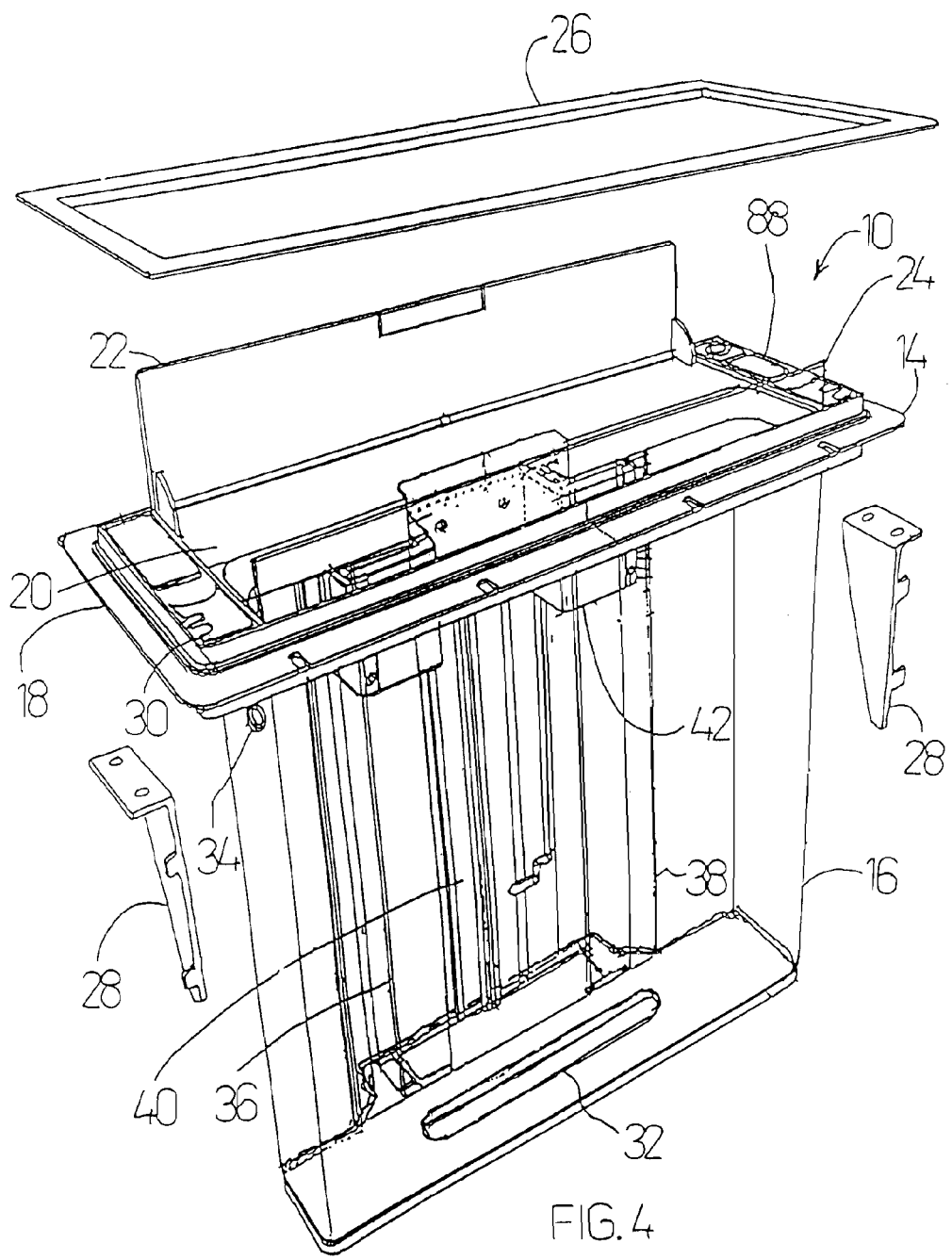
FIG. 4 is a perspective view of an extension and retraction arrangement as disclosed herein apart from a support structure.

An embodiment of an extension and retraction arrangement 10 is depicted apart from the support structure 500 in FIG. 4. There, the extension and retraction arrangement 10 the upper framework 14 can be seen to have a peripheral flange 18 for being retained in relation to a support surface (not shown in FIG. 4) that has an aperture formed therein for receiving the extension and retraction arrangement 10. A subsurface enclosure 16 is fixed to the upper framework 14. The subsurface enclosure 16 defines a protected open inner volume for receiving an article to be retained when the article is in a retracted configuration.

The subsurface enclosure 16 and the upper framework 14 have a shared open mouth 20 that can be selectively closed by the pivotally retained first door 22 in combination with the pivotally retained second door 24. One or more apertures 32 can be disposed in a distal portion of the subsurface enclosure 16 for enabling, among other things, a retrieval of debris and a passage of wiring where necessary. Additionally, one or more wire management apertures 34 can be disposed along a proximal portion of the subsurface enclosure 16 for enabling a passage of wiring and the like. Still further, a removable or pivotable wire management cover 30 can enable further wiring and other access to the open inner volume of the subsurface enclosure 16. The upper flange 26 can couple to the upper framework 14 and can overlie an aperture in a support surface. First and second mounting stabilizers 28 can each have a proximal portion fixed to the support surface and, additionally or alternatively, the upper framework 14 and a distal portion fixed to the subsurface enclosure 16 for providing stabilizing support thereto.

First and second rails 36 and 38 communicate longitudinally within or along the subsurface enclosure 16 from adjacent to the distal end thereof to adjacent to the proximal end thereof. The first and second rails 36 and 38, which are fixed in relation to the subsurface enclosure 16 and the upper framework 14, can be formed and fixed in place separately. Alternatively, as is shown in FIGS. 4 through 8, the first and second rails 36 and 38 can be joined with a spine member 40, such as by being unitarily formed therewith as by an extrusion process or the like or by being fixed thereto.

In either case, a trolley structure 42 can be slidably retained relative to the first and second rails 36 and 38 for reciprocating movement therealong between what can be termed an extended disposition as is depicted in FIG. 4 where the trolley structure 42 is disposed adjacent to the mouth 20 of the subsurface enclosure 16 and the upper framework 14 and a retracted disposition where the trolley structure 42 is disposed adjacent to what can be considered the distal end of the subsurface enclosure 16. The open inner volume of the subsurface enclosure 16 can have a truncated T shape with a head portion of the T provided for reception of the article to be supported, such as a monitor 12, and the base portion of the T for receiving the first and second rails 36 and 38 and the spine member 40.

A greater understanding of the trolley structure 42, the first and second rails 36 and 38, and the relationship therebetween can be had with additional reference to FIGS. 7, 8, and 9A through 9C. The trolley structure 42 can have a central portion 44 with first and second wing portions 46 and 48 fixed thereto, such as by fasteners 50 or by being formed integrally therewith. The central portion 44 can have a centrally disposed alcove 52 with a width $W_1$ disposed inboard of the first and second rails 36 and 38 for receiving a support arm 54 whereby the trolley structure 42 and the first and second rails 36 and 38 can operate with a lesser depth D than might otherwise be required.

Figure 13:
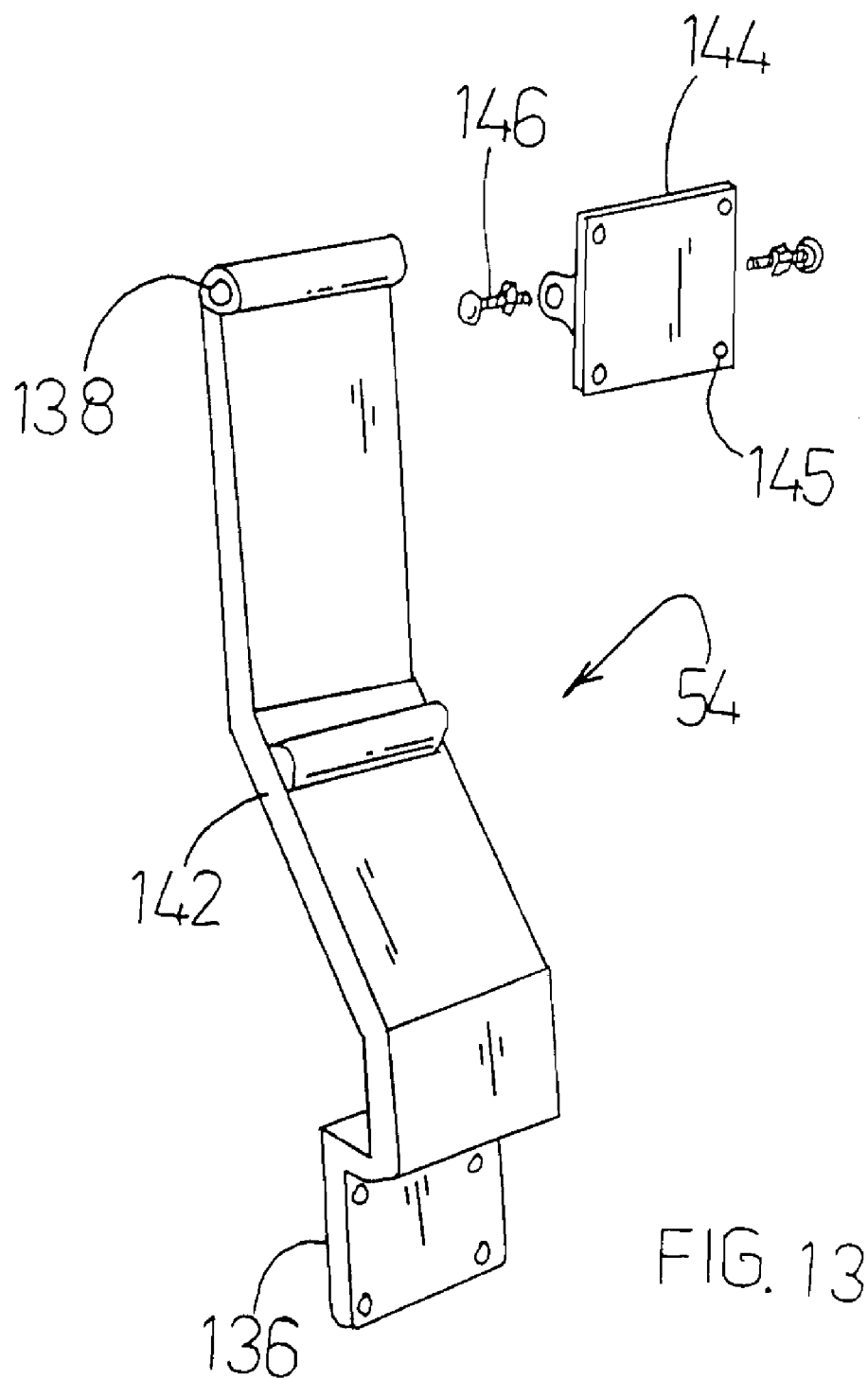
FIG. 13 is a perspective view of a support arm.

One exemplary support arm 54 is shown apart in FIG. 13. There, the support arm 54 can be seen to have a base portion 136 for being fixed to the trolley structure 42, such as by mechanical fasteners 56 as in FIG. 7, a contoured body portion 142, and a tip portion 138. In this example, the tip portion 138 comprises a sleeve for pivotally retaining a support plate 144 by use of axle rods 146. The support plate 144 can have threaded mounting holes 145 therein for enabling a fastening to a flat screen monitor, such as pursuant to the standardized Video Electronics Standards Association Flat Display Mounting Standard for flat panel monitors.

Each rail 36 and 38 can comprise a side plate 58 with a rigid ventral fin 60 projecting laterally from a ventral side thereof and a rigid dorsal fin 62 projecting laterally from a dorsal side thereof. A plurality of wheel structures 64 can project inboard from the wing portions 46 and 48 for rolling along one or both of the ventral fin 60 and the dorsal fin 62. As FIG. 9C shows, each wheel structure 64 can comprise an outer wheel 70 rotatably retained relative to an axle 74 with a bushing 72 therebetween. While the outer wheels 70 could be formed from a variety of materials, one presently contemplated embodiment has outer wheels 70 formed from a high strength acetal resin, such as that sold under the trademark DELRIN.

The bushing 72 of each wheel structure 64 can have a head portion for retaining the outer wheel 70 thereon, a body portion for being received within the outer wheel 70, and a narrowed tip portion for being received in an aperture 76 in the wing portion 46 or 48. The tip portion of the bushing 72 can ensure a centering and precise location of the wheel structure 64 in relation to the aperture 76 and the wing portion 46 or 48 in general. Channels 66 and 68 can communicate longitudinally along the ventral and dorsal fins 60 and 62 for receiving and engaging the wheels 70 of the wheel structures 64. Each of the outer wheels 70 can have an arcuate or otherwise contoured profile for engaging a corresponding profile of the channels 66 and 68 thereby to ensure a precise location and registration of the trolley structure 42 in relation to the first and second rails 36 and 38.

As previously suggested, the support arm 54 will normally retain an article to be supported, such as a monitor or other computer component, to what can be considered the ventral side of the trolley structure 42. As a result, the trolley structure 42 will likely be subjected to a torsion that will tend to press an upper portion of the trolley structure 42 in a ventral direction while pressing a lower portion of the trolley structure 42 in a dorsal direction.

To accommodate such a torque most smoothly and effectively, as FIG. 9A shows in relation to the second wing portion 48, the wing portions 46 and 48 of the trolley structure 42 can have first and second primary load bearing wheel structures 64A disposed to the ventral side of the wing portions 46 and 48 adjacent to the upper ends thereof and first and second primary load bearing wheel structures 64A disposed to the dorsal side of the wing portions 46 and 48 adjacent to the lower ends thereof. To maintain the stability of the trolley structure 42 in the event of an opposite torque, such as might occur where a lifting force is applied thereto, a stabilizing wheel structure 64B can be disposed to the dorsal side of the wing portions 46 and 48 adjacent to the upper ends thereof and to the ventral side of the wing portions 46 and 48 adjacent to the lower ends thereof.

Support for the trolley structure 42 and the article retained thereby can be provided by one or more constant force springs 78 and 80. In this embodiment, each constant force spring 78 and 80 is rotatably retained relative to the spine member 40 by an axle 84 with a first end coupled to the spine member 40 and a second end retained relative to a longitudinal fin 82 that projects inboard from the side plate 58 of the rail 36 or 38. The axles 84 are separated by a width distance $W_2$. The constant force springs 78 and 80 are shown apart in FIG. 16. Each constant force spring 78 and 80 has a distal end fixed to the trolley structure 42, such as to the alcove portion 52 thereof, by any appropriate means, such as a mechanical fastener 86, welding, or any other mechanism.

Figure 16:
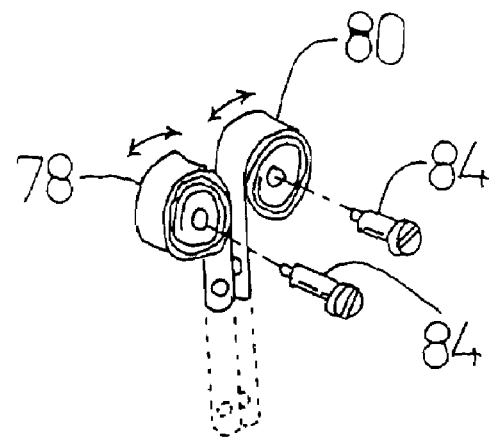
FIG. 16 is a perspective view of constant force springs for use in an extension and retraction arrangement.

As shown in FIG. 16, the constant force springs 78 and 80 can comprise tightly coiled wound spring steel with built in curvature. Each turn of the springs 78 and 80 can wrap tightly around the next inner turn. As the springs 78 and 80 are extended, such as when the trolley 40 and monitor 12 are lowered, an inherent stress in the springs 78 and 80 resists the load at a constant rate thereby ensuring a substantially constant force output.

The constant force springs 78 and 80 can be selected to match with the weight of the monitor 12 to be supported. The constant force springs 78 and 80 can be calibrated to counterbalance the combined weight of the trolley 40, support arm 54, and the monitor 12 in an essentially equipoise situation, with a net lifting force thereby to tend to raise the monitor 12 automatically, or with a net extensive force thereby tending to lower the monitor 12 automatically. Of course, other types and numbers of springs, including compression springs, extension springs, and other types of springs, can be used within the scope of the invention.

Figure 14:
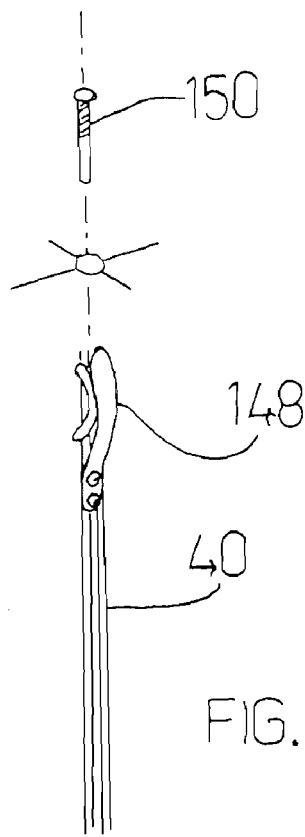
FIG. 14 is a perspective view of a braking arrangement.

Embodiments of the invention can additionally incorporate a means for providing a braking and cushioning effect at either or both ends of travel of the trolley 40 and the monitor 12. One such means in depicted in FIGS. 7 and 8 and then alone in FIG. 14 where just a portion of the spine 40 is shown. There, an arcuate braking member 148 has a first end fixed, such as in relation to the spine 40, and a free body portion. A braking screw 150 is threadedly engaged with the spine 40 to underlie the braking member 148. With this, the braking member 148 will frictionally engage the trolley structure 42 thereby to slow and control its travel and, possibly, to prevent an inadvertent lowering of the monitor 12. The degree of braking provided by the braking member 148 can be adjusted by a rotation of the braking screw 150.

Figure 15:
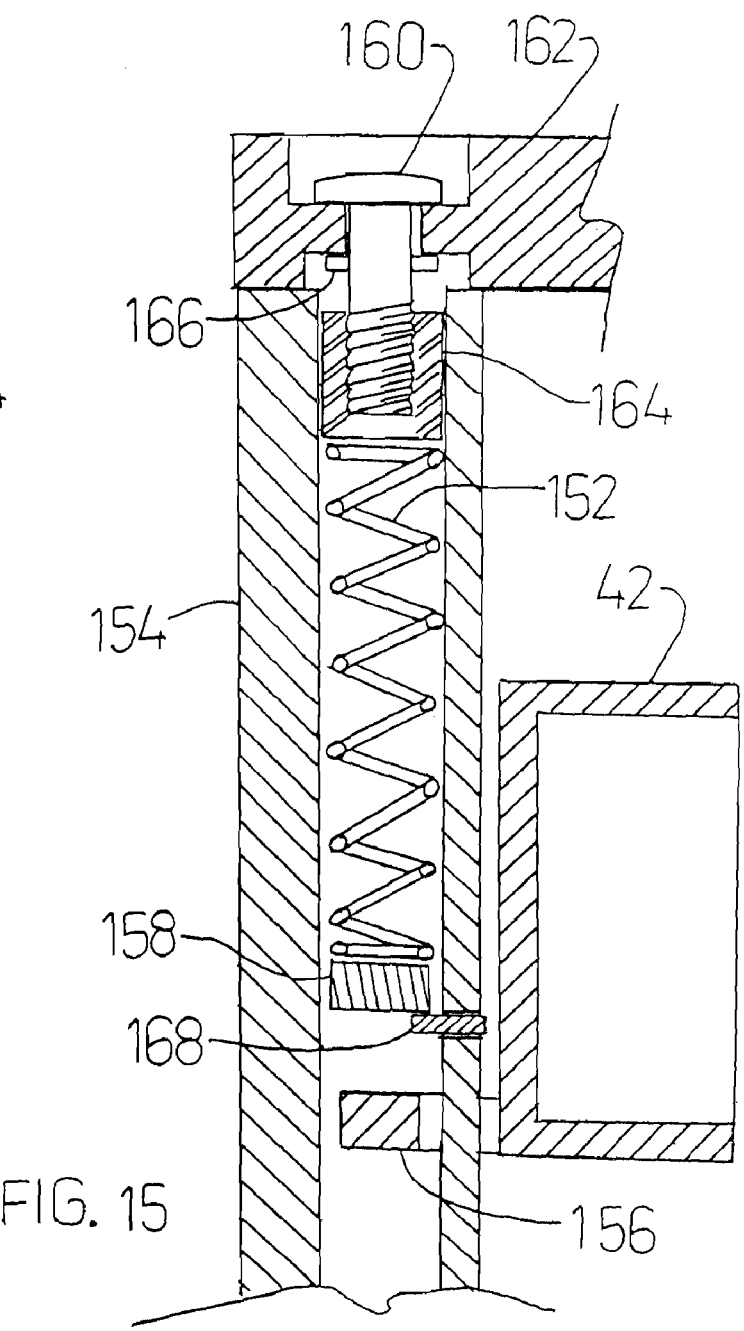
FIG. 15 is a cross sectional view of an alternative braking arrangement pursuant to the invention disclosed herein.

Other braking means are possible pursuant to the invention. For example, an alternative braking arrangement is shown in FIG. 15. There, a compression spring 152 is retained within a spring housing 154, which can be formed within or coupled to the spine 40. A projection 156 from the trolley structure 42 can project into the spring housing 154 to engage the spring 152 to brake and cushion the travel of the trolley structure 42 and the retained monitor 12 or other article. A cap member 158 can be disposed at a distal end of the spring 152 to ensure a positive engagement with the projection 156, and a stop member 168 can project from the spring housing 154 into the open inner volume thereof to prevent excessive extension of the spring 152. The initial deflection of the spring 152 and thus the braking force thereof can be adjusted by an adjustment screw 160 that is rotatably retained relative to an upper portion 162 of the spring housing 154 by a retaining ring 166. The adjustment screw 160 can be threadedly engaged with an adjustment nut 164, which can be separately or integrally formed with the spring housing 154. Under such an arrangement, the spring 152 can provide a cushioning and braking effect as the projection 156 engages the spring 152.

Referring again to FIG. 4, the embodiment of the extension and retraction arrangement 10 depicted therein can be manually operated. The first and second doors 22 and 24 can be spring-loaded. Their opening can be triggered by any appropriate method, such as by a pressing thereon or by operation of a switch, such as the trigger 88 or by a remote control (not shown in this drawing). The trolley structure 42 and the article retained thereby, such as a computer monitor, can automatically extend when the doors 22 and 24 are opened. When the article is to be returned to a storage configuration, a user can simply push the article downward to cause the trolley structure 42 to slide longitudinally along the rails 36 and 38.

Figure 7:
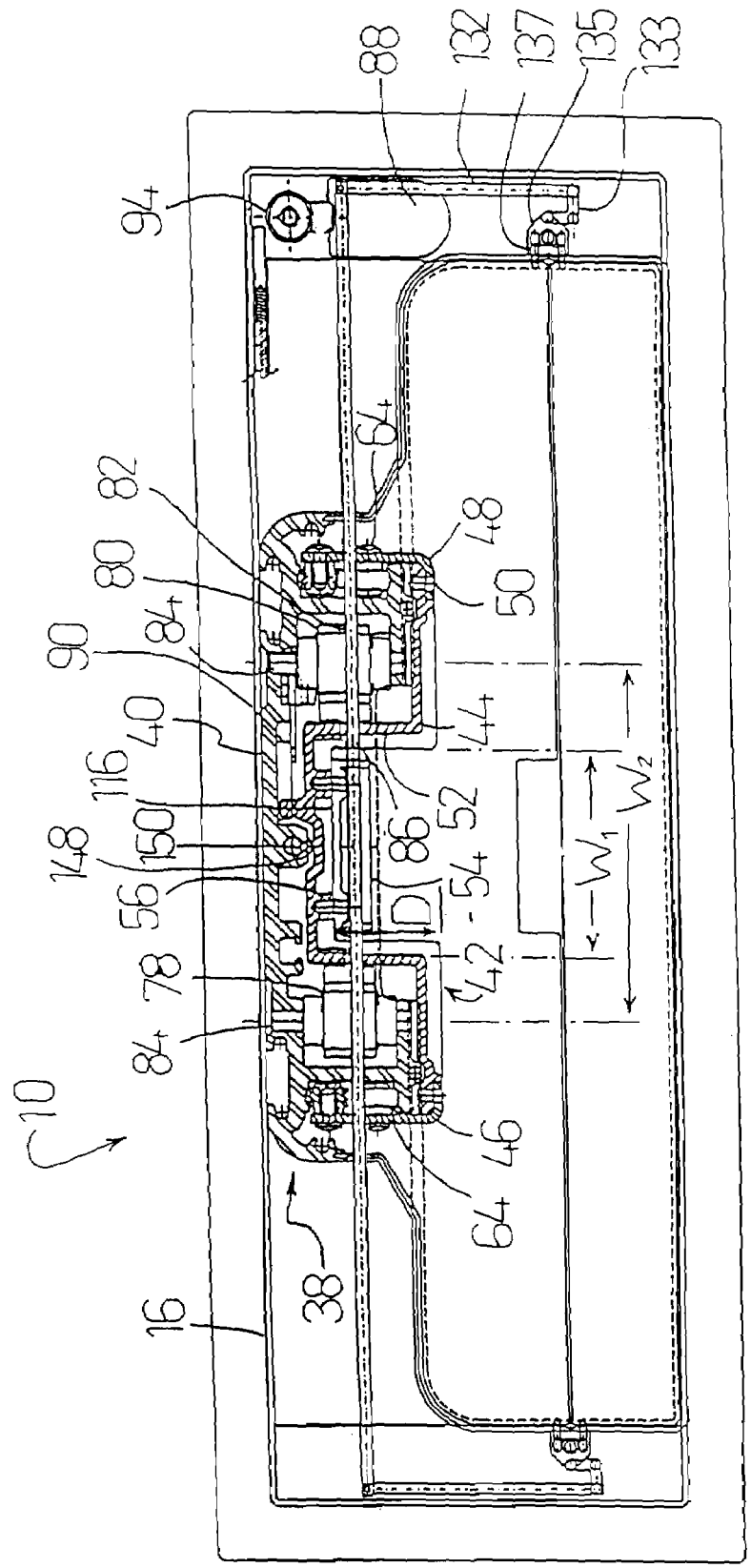
FIG. 7 is a cross sectional view of an extension and retraction arrangement pursuant to the invention disclosed herein.
Figure 8:
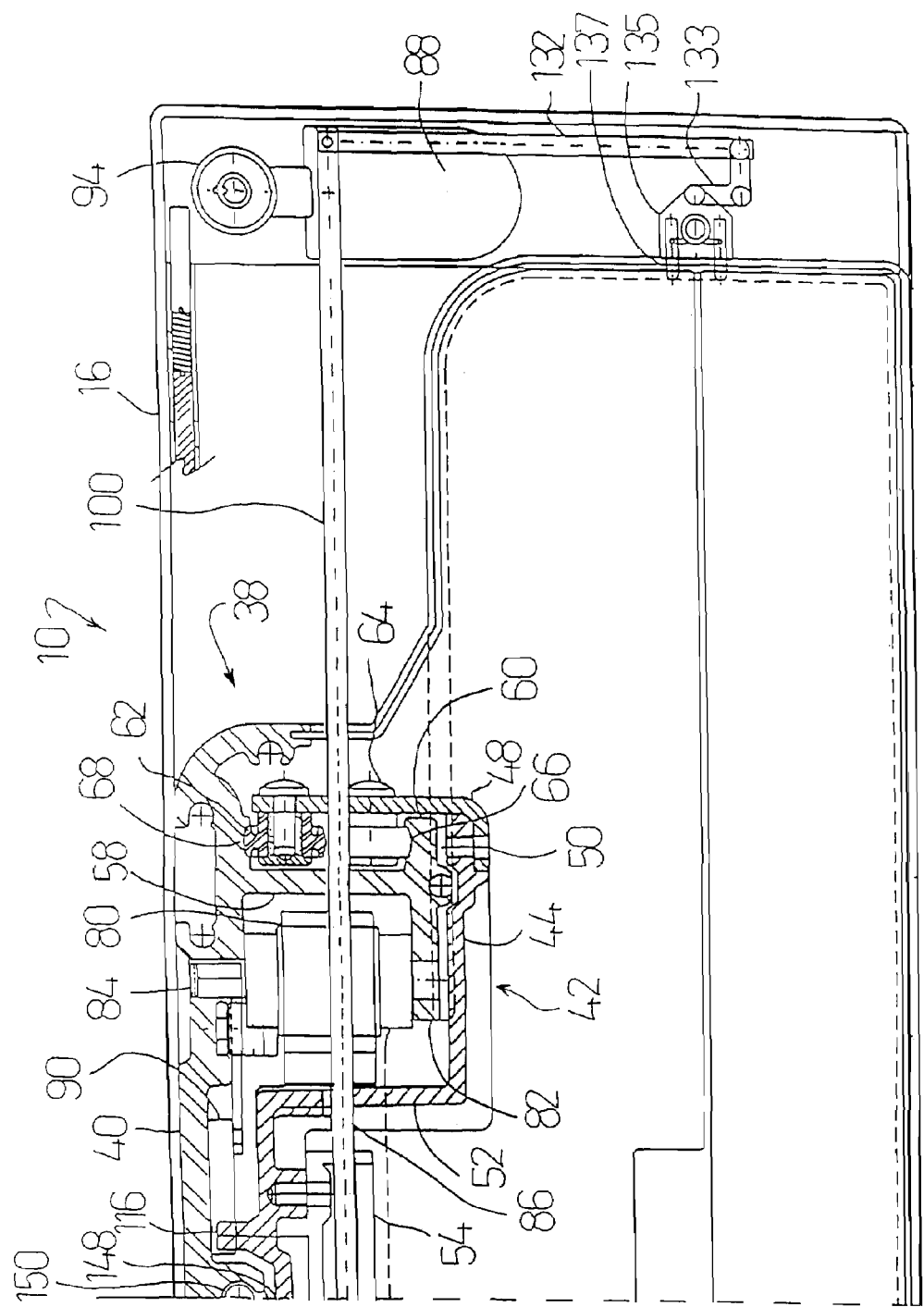
FIG. 8 is a magnified cross sectional view of the extension and retraction arrangement of FIG. 7.
Figure 10:
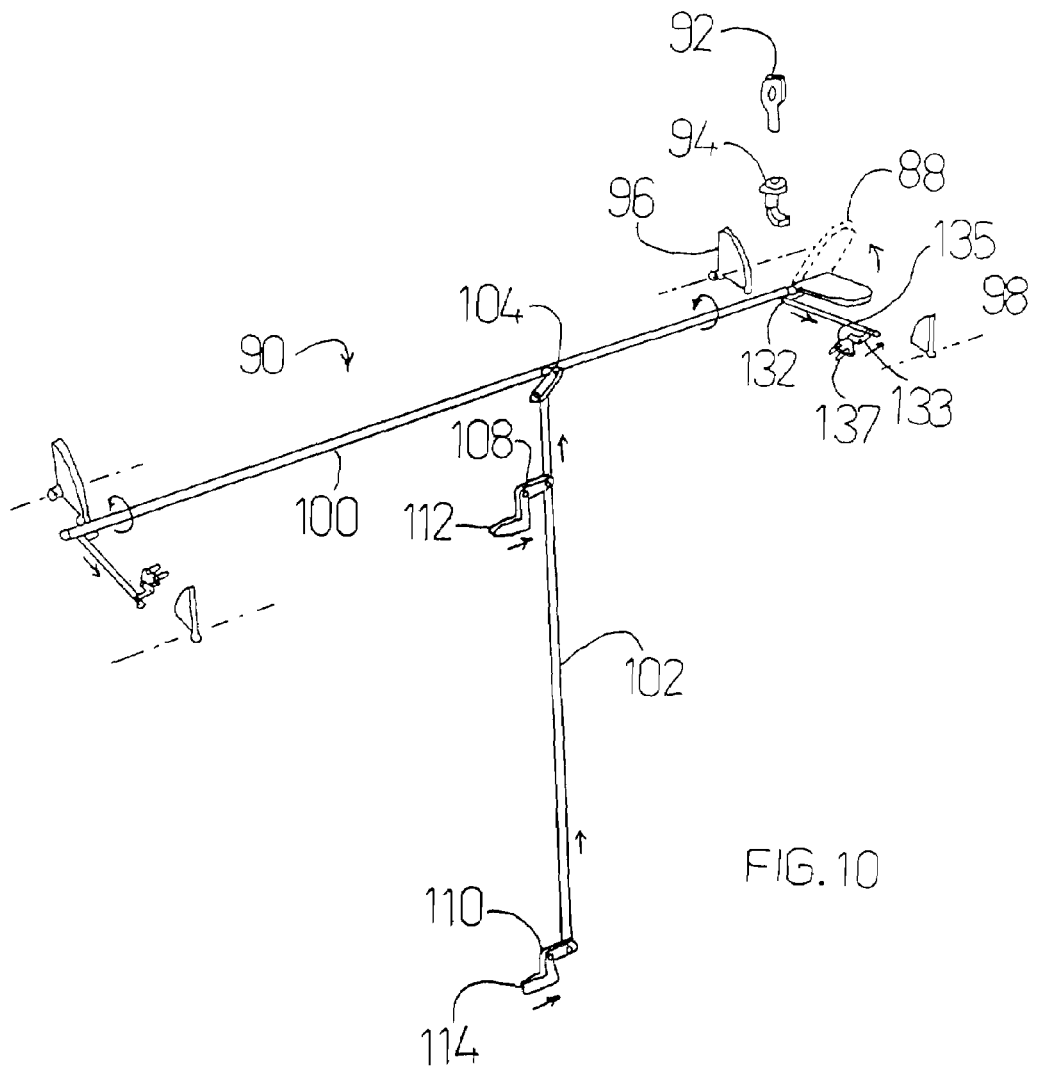
FIG. 10 is a perspective view of a manual actuation arrangement.

The operation and movement of the large and small doors 22 and 24 and the trolley structure 42 can be controlled by a manual actuating arrangement 90, which can be understood with combined reference to FIGS. 7, 8, and 10. The manual actuating arrangement 90 can be controlled by the trigger 88. More particularly, a lateral axle 100 can be rotated by a pivoting of the trigger 88. An actuating rod 132 can have a first end coupled to the lateral axle 100 and a second end coupled to a first leg of a pivotally retained L-shaped actuator 133. An engaging member 135 with locking tips 137 projecting therefrom can be pivotally coupled to a second leg of the L-shaped actuator 133. The large and small doors 22 and 24 can have spring-loaded disc portions 96 and 98 operably associated therewith, such as at each end thereof. With this, a sufficient turning of the lateral axle 100 will disengage the locking tips 137 from the first and second doors 22 and 24 thereby allowing the doors 22 and 24 to open. Each door 22 and 24 can have a frictional damper associated therewith to ensure a smooth opening process.

Additionally, a vertical locking rod 102 can be coupled to the lateral axle 100 by a pivot rod 104 such that the vertical locking rod 102 can be reciprocated upwardly and downwardly by a rotation of the lateral axle 100. The vertical locking rod 102 can have a pivotally retained proximal L-shaped actuator 108 with an engaging tip 112 proximally coupled thereto and a pivotally retained distal L-shaped actuator 110 with an engaging tip 114 distally coupled thereto. Also, looking again to FIGS. 7 and 8, the trolley structure 42 can have a locking projection 116 projecting dorsally therefrom.

The trolley structure 42 can be selectively locked in a retracted configuration by an engagement of the engaging tip 114 of the distal L-shaped actuator 110 with the locking projection 116. Similarly, the trolley structure 42 can be selectively locked in an extended configuration by an engagement of the engaging tip 112 of the proximal L-shaped actuator 108 with the locking projection 116. The trolley structure 42 can be released from each position by a simple actuation of the trigger 88 to cause the respective tip 112 or 114 to pivot out of engagement with the locking projection 116. The lock 94, which can be operated by a key 92 or any other effective arrangement, can selectively prevent operation of the trigger 88.

Use of an embodiment of a non-motorized extension and retraction arrangement 10 as in FIG. 4 with a manual actuation arrangement 90 as in FIG. 10 can be initiated by a pivoting or other actuation of the trigger 88. With a sufficient pivoting of the trigger 88, the actuating rod 132 can induce a pivoting of the L-shaped actuator 133 thereby to release the first and second doors 22 and 24 as the locking tips 137 are drawn out of engagement therewith. The spring-loaded disc portions 96 and 98 can then smoothly pivot the first and second doors 22 and 24 to an open configuration. Simultaneously, the rotation of the lateral axle 100 can produce a vertical displacement of the vertical locking rod 102 thereby to pivot the engaging tip 114 of the distal L-shaped member 110 out of engagement with the locking projection 116 of the trolley structure 42. The trolley structure 42 is thus released from its retracted position.

Where the constant force springs 78 and 80 are calibrated to produce a net lifting force, the trolley 40, support arm 54, and the monitor 12 can then automatically rise to an extended position as in FIG. 1. The means for providing a braking and cushioning effect, whether in the form of an arcuate braking member 148, a compression spring 152, or any other form, can enable a smooth and controlled stopping of the travel of the trolley structure 42 and the retained monitor 12 or other article. The engaging tip 112 of the proximal L-shaped actuator 108 can then engage the locking projection 116 of the trolley structure 42 thereby locking the monitor 12 and the trolley structure 42 in an extended configuration.

The first and second doors 22 and 24 can then be adjusted to a closed configuration as in FIG. 1 to prevent debris from passing through the aperture 15 in the support structure 500 and to achieve a finished appearance. It will be noted that providing first and second doors 22 and 24 as compared to just a single door can be considered to be advantageous for a number of reasons. For example, with first and second doors 22 and 24, the monitor 12, and consequently the support arm 54 and the trolley 42, can be raised to a reduced height to gain clearance relative to the doors 22 and 24 than would be required if just a single door were provided. Since the height to which the monitor 12 must be raised directly affects the required length of the first and second rails 36 and 38 and the subsurface enclosure in general 16, the provision of first and second doors 22 and 24 enables the extension and retraction arrangement 10 to be rendered more efficient and compact. Furthermore, the first and second doors 22 and 24 enable the arm aperture 25, and thus the support arm 54, to be centrally disposed in relation to the aperture 15 and the extension and retraction arrangement 10.

When the monitor 12 is to be lowered, the trigger 88 can again be actuated to reopen the doors 22 and 24 and to release the engaging tip 112 of the proximal L-shaped actuator 108. The monitor 12, support arm 54, and the trolley structure 42 can be pressed to a retracted position and locked there by the engaging tip 114 of the distal L-shaped actuator 110. The doors 22 and 24 can be pressed closed and retained there by an engagement with the locking tips 137.

Figure 12:
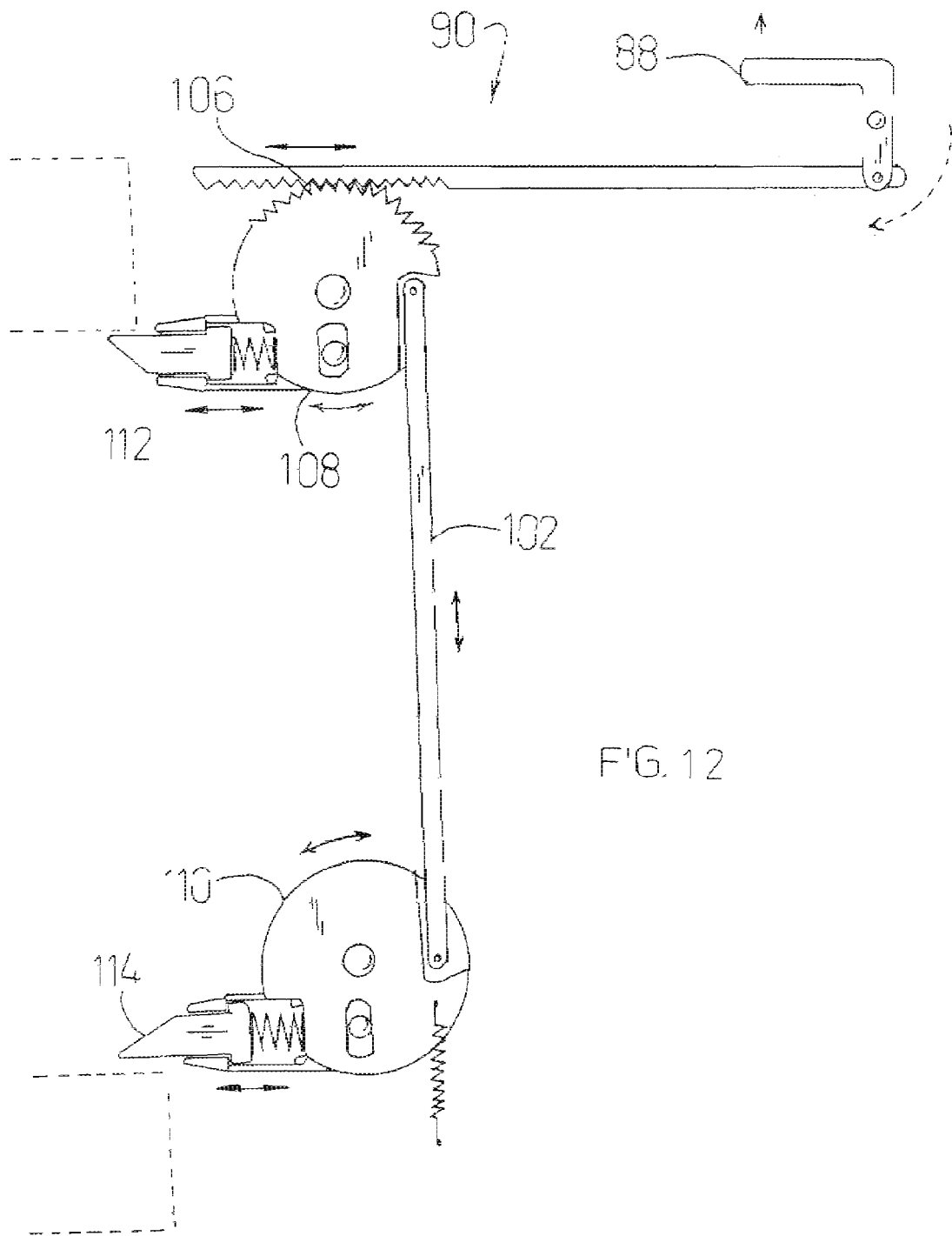
FIG. 12 is a perspective view of an alternative manual actuation arrangement.

A variation of the manual actuation arrangement 90 is shown in FIG. 12. There, engaging tips 112 and 114 are again provided for selectively engaging and retaining the locking projection 116 of the trolley structure 42. However, the L-shaped actuators 108 and 110 instead comprise rotatably retained disc-shaped actuators 108 and 110. Furthermore, a pivot gearing arrangement 106 is instead employed to induce a reciprocation of the vertical locking rod 102 in response to an actuation of the trigger 88.

Figure 5:
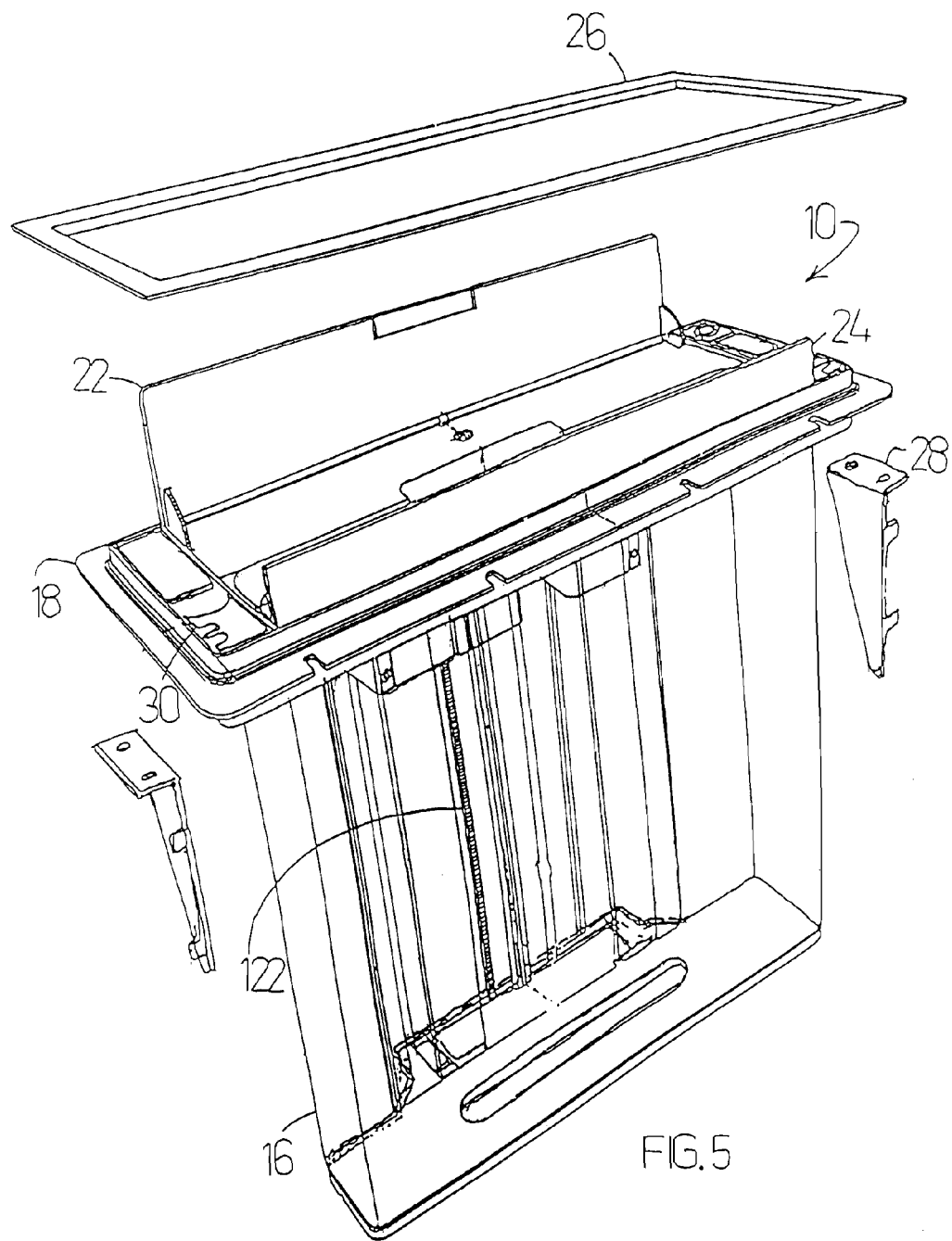
FIG. 5 is a perspective view of a further extension and retraction arrangement pursuant to the present invention.
Figure 6:
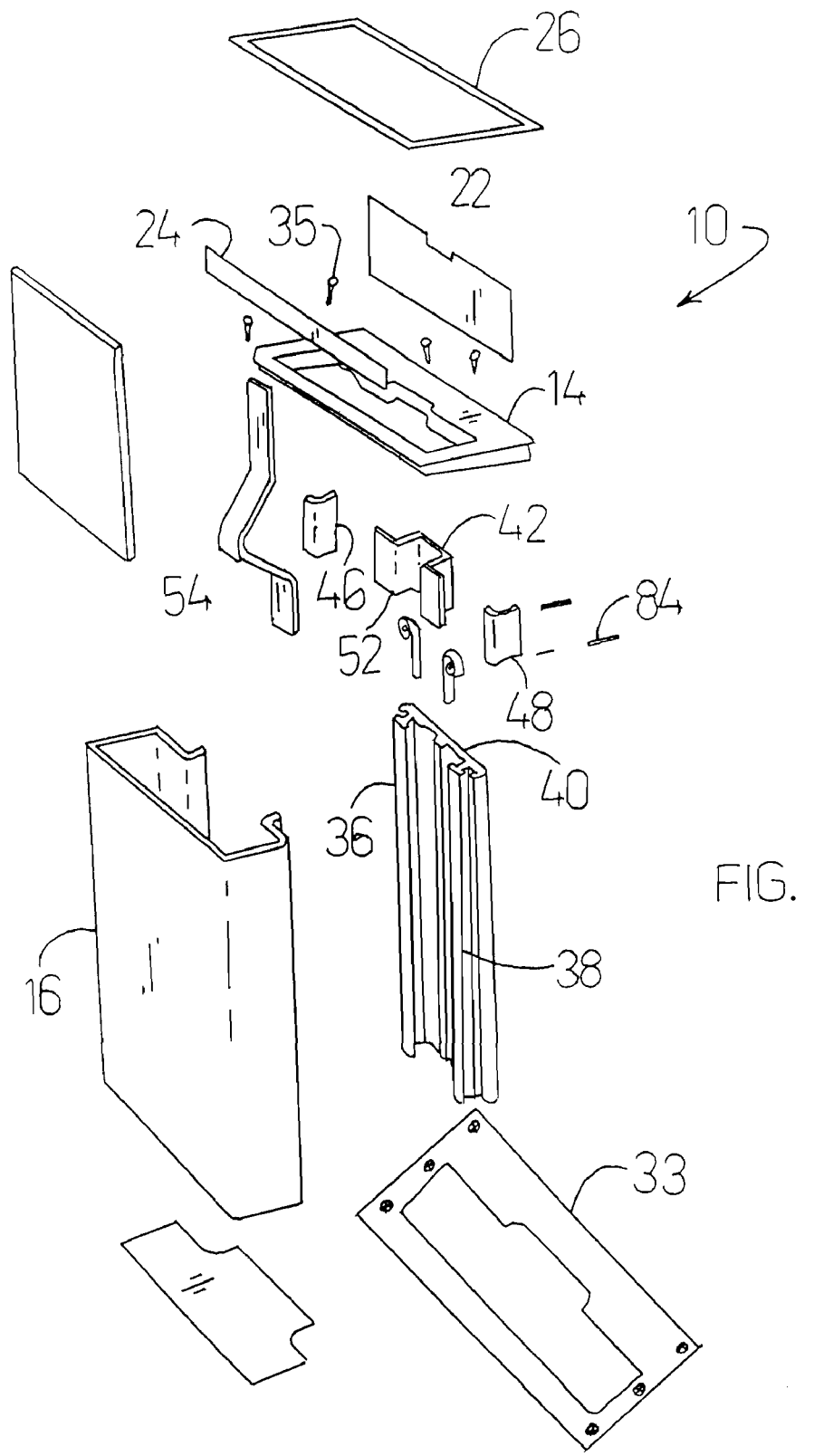
FIG. 6 is an exploded perspective view of an extension and retraction arrangement under the instant invention.
Figure 11:
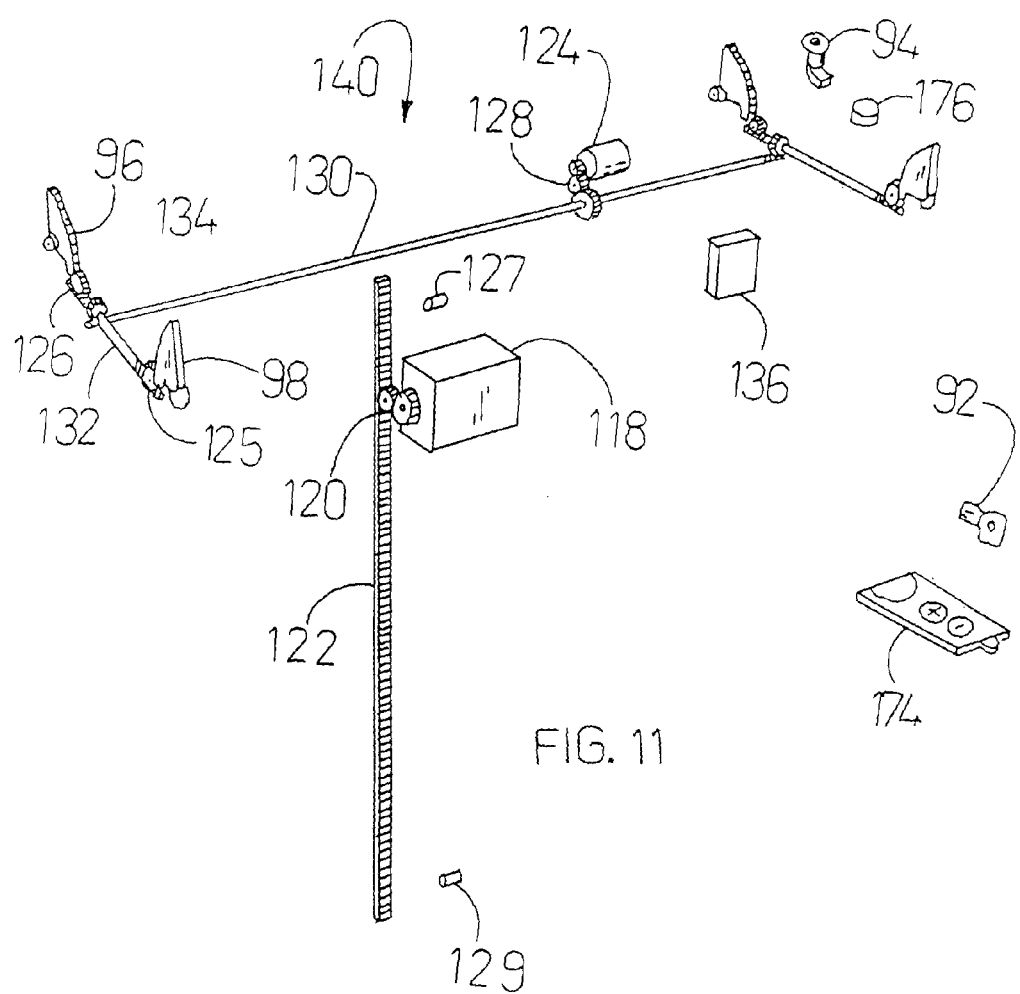
FIG. 11 is a perspective view of a motorized actuation arrangement.

As the embodiment of FIG. 5 makes clear, the extension and retraction arrangement 10 can alternatively be motorized. An example of a motorized drive and actuating arrangement 140 is shown in FIG. 11. A drive motor 118 can be fixed relative to the trolley structure while a rack gear 122 can be fixed relative to the spine 40 and the first and second rails 36 and 38 shown, for example, in FIG. 7. A pinion gearing arrangement 120 can drivingly engage the drive motor 118 with the rack gear 122. A secondary motor 124 can be drivingly associated with a lateral rod 130 by a gearing arrangement 128. The lateral rod 130 can in turn be drivingly engaged with door driving rods 132 by a worm gear arrangement 134. The door driving rods 132 can engage the first door 22 by a gear arrangement 126 between the door driving rods 132 and geared disc portions 96 of the first door 22. Similarly, the door driving rods 132 can engage the second door 24 by a gear arrangement 125 between the door driving rods 132 and geared disc portions 98 of the second door 24. Constant force springs 78 and 80 as shown in FIG. 7 may or may not be included to provide a counterbalancing force in relation to the trolley structure 42, the monitor 12, and the support arm 54.

A lock 94 and key 92 combination can enable access and control of the extension and retraction arrangement 10. Alternatively or additionally, as shown in relation to the alternative embodiment of FIG. 17, access and control of the extension and retraction arrangement 10 could be controlled by a card reader 172 in combination with an access card 170. The access card 170 could be of any suitable type including, by way of example, a dedicated security card, an identification card, a credit card, a purchased card, or any other type of access card 170. Still further, access and control could be had by operation of a remote control unit 174 in combination with a receiver 176 as is also shown in FIG. 11.

Actuation of the motorized drive and actuating arrangement 140 of FIG. 11 can induce the secondary motor 124 into operation thereby to rotate the lateral rod 130 with a resultant rotation of the door driving rods 132 and an opening of the doors 22 and 24 as the disc portions 96 and 98 are driven by the gearing arrangements 126 and 125. Simultaneously with, before, or after, the opening of the doors 22 and 24, the drive motor 118 can be induced into operation thereby to cause it, the trolley structure 42, and the retained monitor 12 to climb the rack gear 122 until an extended disposition is reached as may be sensed by an upper limit switch 127 or other means. The first and second doors 22 and 24 can then be closed by the secondary motor 124.

When the monitor 12 or other article is to be retracted, the lock 94 and key 92, the card reader 172 and access card 170, the trigger 88, the remote control unit 174 and receiver 176, or any other means can be employed to induce the secondary motor 124 into operation to open the doors 22 and 24. The drive motor 118 can then be actuated to propel the trolley structure 42, the monitor 12, and the support arm 54 to a retracted configuration. The doors 22 and 24 can then be closed by operation of the secondary motor. Of course, one skilled in the art would find it readily obvious and within the scope of the invention to employ a single motor or more than two motors for opening the doors 22 and 24 and raising and lowering the trolley structure 42.

Figure 18:
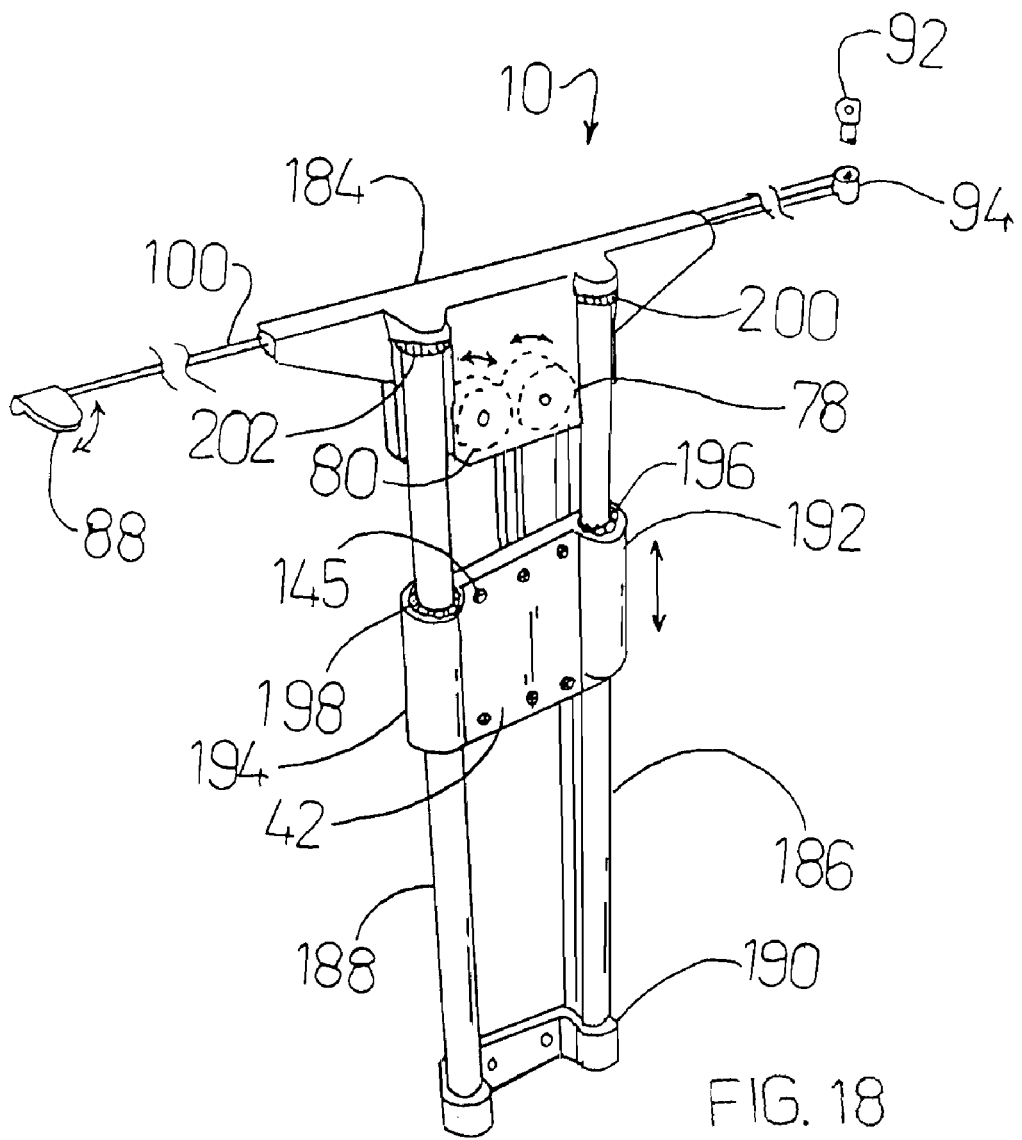
FIG. 18 is a perspective view of another alternative extension and retraction arrangement.

An alternative extension and retraction arrangement is again indicated at 10 in FIG. 18. The extension and retraction arrangement 10 has a support base 184 relative to which a pair of cylindrical support rods 186 and 188 are mounted in parallel spaced orientation relative to one another. Distal ends of the cylindrical support rods 186 and 188 are mounted on a lower support bracket 190. A trolley structure 42 is slidably engaged with the support rods 186 and 188.

The trolley structure 42 in this embodiment includes opposing bushings 192 and 194 that slide along the support rods 186 and 188. Bearings 196, 198 provide smooth gliding engagement between the bushings 192 and 194 and the support rods 186 and 188. Threaded mounting holes 145 are again formed in the trolley structure 42 in accordance with the Video Electronics Standards Association Flat Display Mounting Standard for flat panel monitors. Constant force springs 78 and 80 are rotatably retained relative to the support base 184 and have distal ends connected to the trolley structure 42.

To prevent damage to the monitor 12 as it reaches an extended position, rubber o-rings 200 and 202 mounted on the upper or proximal ends of the support rods 186 and 188 provide shock absorption for the trolley structure 42. A lock 94 and key 92 combination or other means can control access and operation of the extension and retraction arrangement 10 to prevent unauthorized access to the monitor 12 or other supported article. The lock 94 can prevent rotation of the lateral axle 100 until the key 92 or other means is actuated.

Figure 17:
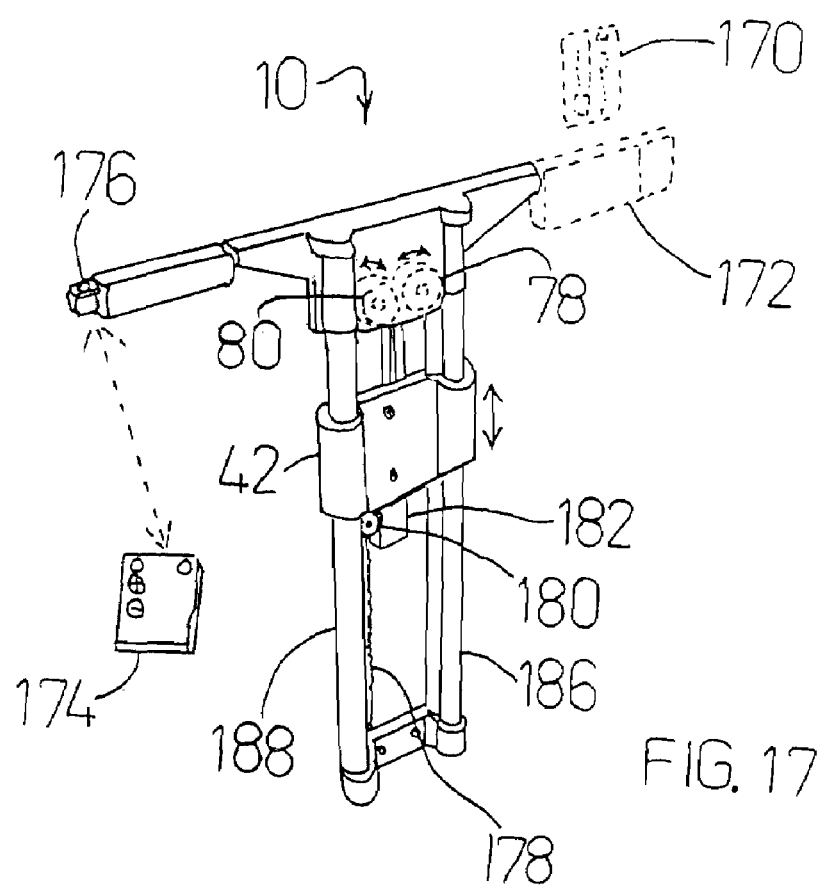
FIG. 17 is a perspective view of an alternative extension and retraction arrangement.

As shown in FIG. 17, the raising and lowering of the trolley structure 42 can be driven by a motor 182 that drives a pinion gear 180 along a rack gear 178. The rack gear 178 can be disposed along a support rod 188 or otherwise disposed, such as along a subsurface enclosure (not shown). As previously described, access and control can additionally be controlled by a card reader 172 and access card 170 and, additionally or alternatively, a remote control unit 174 and receiver 176. Such an extension and retraction arrangement 10 can be employed with or without constant force springs 78 and 80.

Figure 19:
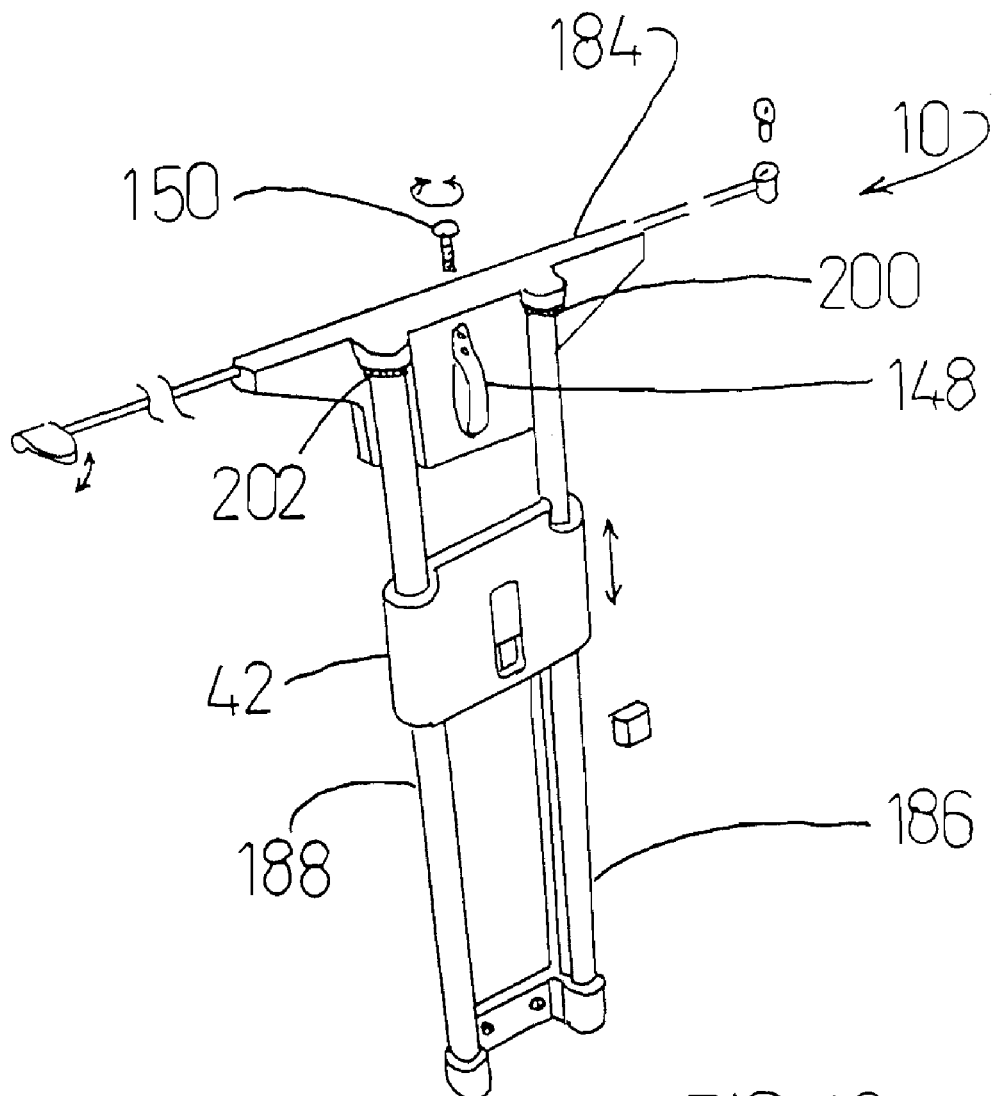
FIG. 19 is a perspective view of still another extension and retraction arrangement under the present invention.

With reference to FIG. 19, one sees that a braking arrangement can again be provided. The braking arrangement can again include an arcuate braking member 148 and a braking screw 150 for adjusting the braking force to be applied. The braking member 148 can have a first end fixed in relation to the support base 184 and a free body portion.

Extension and retraction arrangements 10 can be supplied with a support structure 500, such as the desk in FIGS. 1 through 3, as original equipment. Alternatively, extension and retraction arrangements 10 can be supplied in retrofit kit form. As one can perceive from FIG. 6, such a kit could include the extension and retraction arrangement 10, mounting fasteners 35, and a template 33 for cutting an aperture 15 in a support structure 500 in which it is to be installed. With an extension and retraction arrangement 10 installed in relation to a support structure, whether before or after sale to the ultimate consumer, a monitor 12 can be readily mounted to the support arm 54. The support structure 500, the extension and retraction arrangement 10, and the monitor 12 can be sold integrated together. Alternatively, the monitor 12 and an extension and retraction arrangement 10 can be sold as a package.

Figure 20:
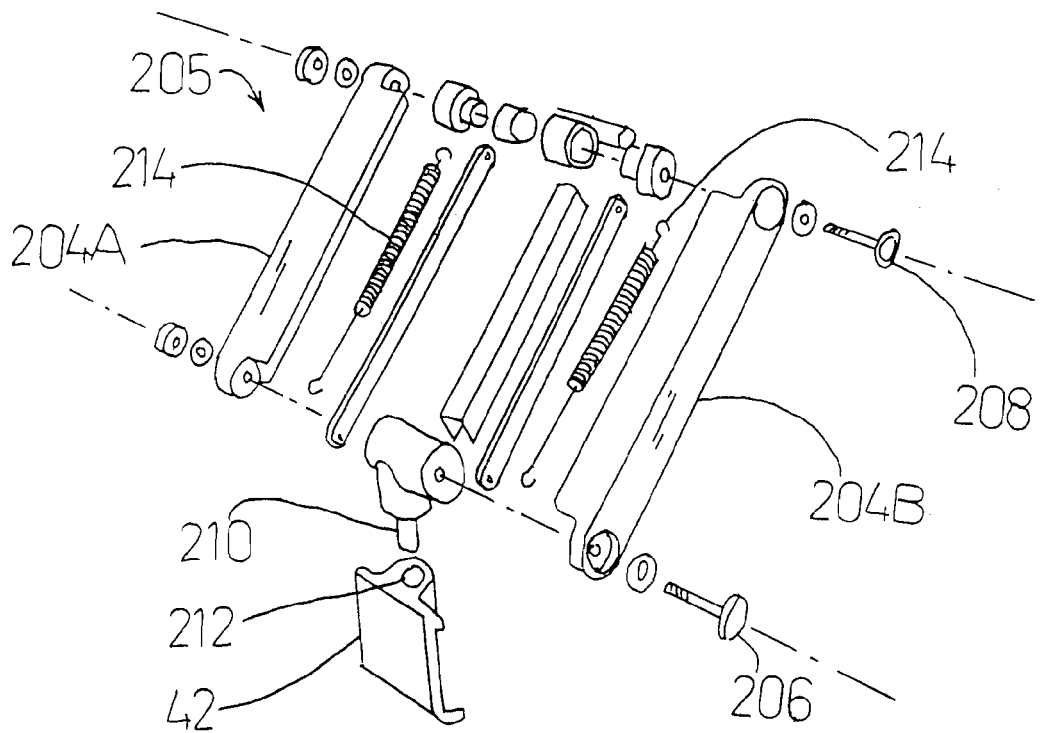
FIG. 20 is an exploded perspective view of an adjustable arm for use pursuant to the invention.
Figure 21:
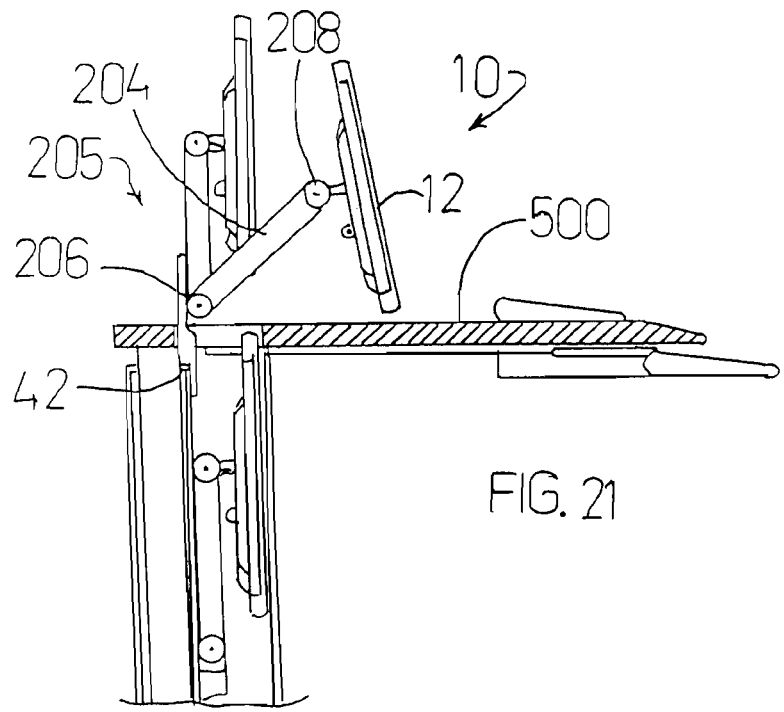
FIG. 21 is a cross sectioned view in side elevation of an extension and retraction arrangement employing the adjustable arm of FIG. 20.

With reference to FIGS. 20 and 21, an extension and retraction arrangement 10 is depicted that not only extends and retracts an article, such as a monitor 12, but also enables an adjustment of the position, orientation, and location of the monitor 12 by use of a spring balanced arm arrangement 205. The spring balanced arm arrangement 205 can have an arm 204 that can be pivotally coupled to the trolley structure 42 at a proximal pivot axis 206. The monitor 12 can be pivotally coupled to the arm 204 at a distal pivot axis 208. The arm 204 can include first and second arm portions 204A and 204B and can be balanced by one or more springs 214. Additionally, the arm 204 can rotate about a vertical axis relative to the support structure 500 by a rotation of a pivot rod 210 that projects from the proximal pivot axis 206 and is received into a pivot aperture 212 in the trolley structure 42.

Figure 22:
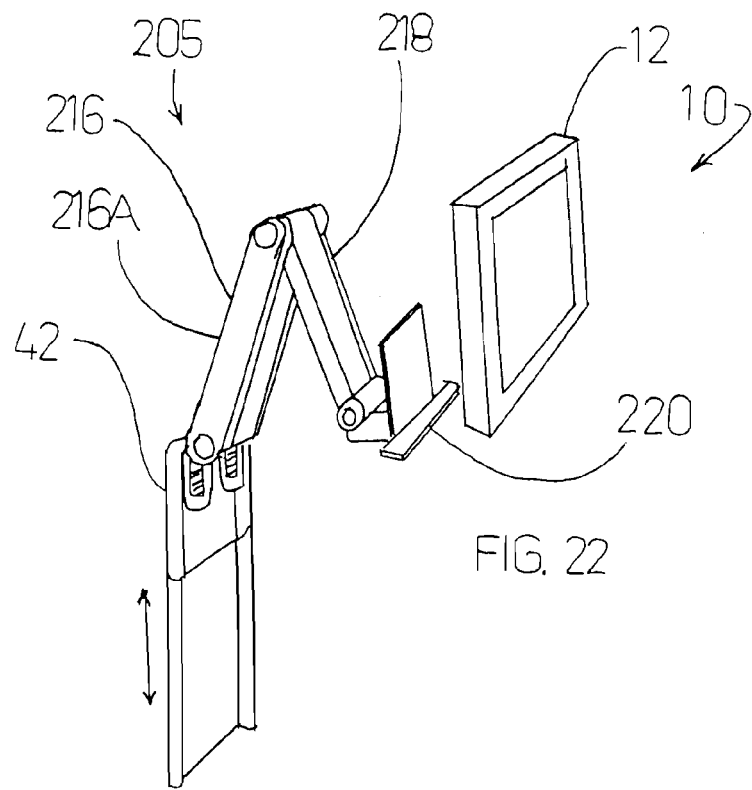
FIG. 22 is a perspective view of an extension and retraction arrangement employing an alternative articulated arm.

In FIG. 22, the spring balanced arm 205 can be articulated with a first arm 216 pivotally coupled at a proximal end to the trolley structure 42 and a distal end pivotally coupled to a proximal end of a second arm 218. The monitor 12 can be pivotally coupled to the monitor 12 by a monitor mounting bracket 220. The first arm 216 can be formed by spaced first and second arm portions 204A and 204B, and the second arm 218 can be pivoted to be disposed inboard of the first and second arm portions 204A and 204B to enable a most compact storage of the spring balanced arm 205.

Figure 23:
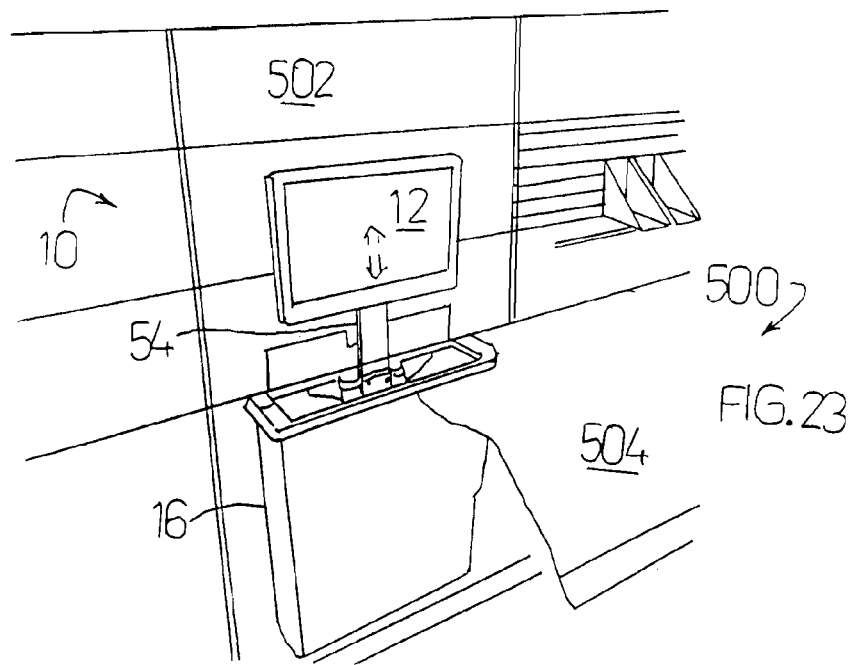
FIG. 23 is a perspective view of an extension and retraction arrangement pursuant to the present invention retained in relation to a slot wall arrangement.

As noted previously, extension and retraction arrangements 10 under the present invention can be employed relative to numerous different types of support structures 500, not only desks. For example, turning to FIG. 23, an extension and retraction arrangement 10 is retained relative to a support structure 500 comprising a slot wall arrangement. The slot wall arrangement can have a wall portion 502 and, possibly, a desk portion 504. The subsurface enclosure 16 and the extension and retraction arrangement 10 in general can be secured relative to a slot 222 in the wall portion 502 to enable the monitor 12 and support arm 54 to be extended from the subsurface enclosure 16, possibly through the desk portion 504. Alternatively, the subsurface enclosure 16 of the extension and retraction arrangement 10 can be disposed within a wall portion 502, which may or may not be a slot wall. In certain cases, for example, the wall portion 502 can comprise a typical office partition wall or any other type of wall.

Figure 24A:
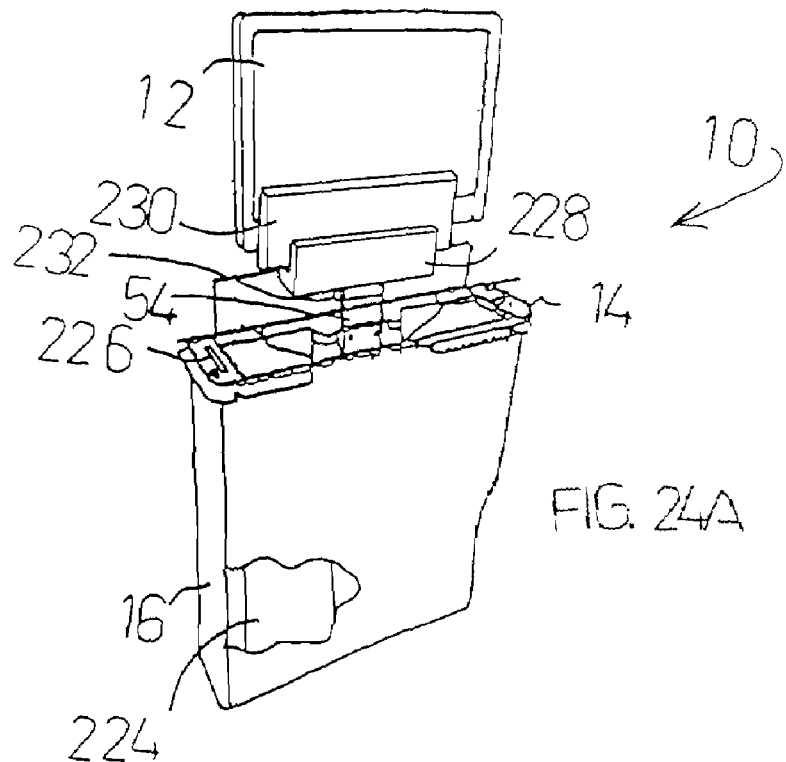
FIGS. 24A and 24B are perspective views of yet another extension and retraction arrangement under the present invention.
Figure 24B:
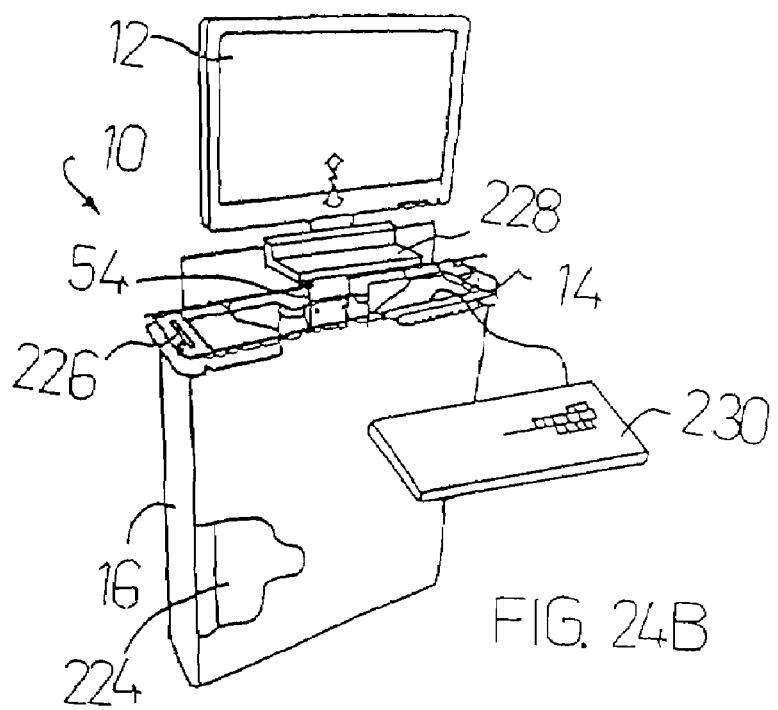

Yet another embodiment of the extension and retraction arrangement 10 is depicted in FIGS. 24A and 24B. There, a computer central processing unit 224 is retained within the subsurface enclosure 16 for interaction with the monitor 12, a keyboard 230, and any further computer components that may be required. Furthermore, one or more computer drive units 226 can be incorporated into the extension and retraction arrangement 10, such as in relation to the upper framework 14 as in FIGS. 24A and 24B. With this, the extension and retraction 10 arrangement could house or essentially comprise a self-enclosed computer system.

In certain practices of the invention, a keyboard 230 can additionally or alternatively be retained for extension and retraction. As shown in FIGS. 24A and 24B, for example, a keyboard 230 can be retained relative to the support arm 54, and thus relative to the trolley structure 42 (not shown in FIGS. 24A and 24B) by a keyboard cradle 228. The keyboard cradle 228 could be fixed in relation to the support arm 54 or pivotable by use of a pivot arrangement 232. The keyboard 230 can be used while retained in relation to the keyboard cradle 228, or it can be removable as in FIG. 24B.

With certain details and embodiments of the present invention for trolley and rail systems for use in relation to the extension and retraction of a supported article disclosed, it will be appreciated by one skilled in the art that numerous changes and additions could be made thereto without deviating from the spirit or scope of the invention. This is particularly true when one bears in mind that the presently preferred embodiments merely exemplify the broader invention revealed herein. Accordingly, it will be clear that those with major features of the invention in mind could craft embodiments that incorporate those major features while not incorporating all of the features included in the preferred embodiments.

Therefore, the following claims are intended to define the scope of protection to be afforded to the inventor. Those claims shall be deemed to include equivalent constructions insofar as they do not depart from the spirit and scope of the invention. It must be further noted that a plurality of the following claims express certain elements as means for performing a specific function, at times without the recital of structure or material. As the law demands, these claims shall be construed to cover not only the corresponding structure and material expressly described in this specification but also all equivalents thereof.

I claim as deserving the protection of Letters Patent:

1. A trolley and rail system for use in relation to an extension and retraction arrangement, the trolley and rail arrangement comprising:

a trolley structure;

a rail arrangement with a first end, a second end, and a body portion wherein the rail arrangement comprises first and second rails retained in substantially parallel spaced orientation relative to one another;

a means for retaining the trolley structure in relation to the rail arrangement for axial extension and retraction along the body portion of the rail arrangement;

wherein the trolley structure has a first portion for engaging the first rail, a second portion for engaging the second rail, and a body portion between the first and second portions and wherein the body portion has an alcove therein disposed inboard of the first and second rails; and a means for retaining an article to be supported in relation to the alcove in the body portion of the trolley structure wherein the means for retaining an article to be supported comprises a support arm with a first end coupled to the trolley structure within the alcove in the body portion of the trolley structure, an elongate body portion that projects beyond the alcove in the body portion of the trolley structure, and a second end spaced from the first end of the support arm.

2. The trolley and rail system of claim 1 wherein each of the first and second rails comprises a cylindrical support rod with a first end and a second end and wherein the means for retaining the trolley structure comprises first and second tubular bushings for matingly receiving the first and second rails in a slidable relationship.

3. The trolley and rail system of claim 2 further comprising bearings interposed between the first and second tubular bushings and the first and second rails.

4. The trolley and rail system of claim 1 further comprising a first mounting base that retains the first ends of the first and second rails and a second mounting base that retains the second ends of the first and second rails and further comprising a means for asisting a travel of the trolley structure toward the first ends of the first and second rails.

5. The trolley and rail system of claim 1 further comprising a means for assisting a travel of the trolley structure toward the first ends of the first and second rails wherein the means for assisting the travel of the trolley structure comprises at least one constant force spring coupled to the trolley structure and to the first mounting base.

6. A trolley and rail system for use in relation to an extension and retraction arrangement, the trolley and rail arrangement comprising:

a trolley structure with a central portion and first and second wing portions;

a rail arrangement with a first end, a second end, and a body portion wherein the rail arrangement comprises first and second rails retained in substantially parallel spaced orientation relative to one another and wherein each of the first and second rails has a dorsal side, a ventral side, and a rigid bearing surface;

a means for retaining the trolley structure in relation to the rail arrangement for axial extension and retraction along the body portion of the rail arrangement;

at least one load bearing wheel rotatably retained in relation to each of the first and second wing portions of the trolley structure for engaging the respective rigid bearing surfaces of the first and second rails;

wherein each of the first and second rails has a rigid dorsal bearing surface facing the dorsal side of the respective rail and a rigid ventral bearing surface facing the ventral side of the respective rail, wherein the rigid dorsal bearing surface of each rail is disposed in general opposition to and in a facing relationship with the rigid ventral bearing surface of the respective rail, and wherein the trolley structure has at least one load bearing wheel disposed to engage the rigid dorsal bearing surface and at least one load bearing wheel to engage the rigid ventral bearing surface whereby the load bearing wheels are disposed between the dorsal and ventral bearing surfaces of the first and second rails and whereby the load bearing wheels can impart opposed dorsal and ventral forces on the first and second rails.

7. The trolley and rail system of claim 6 further comprising a means for retaining a supported article in relation to the trolley structure.

8. The trolley and rail system of claim 7 wherein the means for retaining a supported article comprises a plurality of threaded mounting holes disposed in accordance with the Video Electronics Standards Association Flat Display Mounting Standard for flat panel monitors.

9. The trolley and rail system of claim 6 wherein the rigid bearing surfaces of the first and second rails and the load bearing wheels of the first and second wing portions of the trolley structure have correspondingly contoured profiles.

10. The trolley and rail system of claim 6 wherein the first and second wing portions of the trolley structure each has a first end proximal to the first end of the rail arrangement and a second end proximal to the second end of the rail arrangement and wherein each wing portion has at least one primary load bearing wheel disposed to the ventral side of the respective wing portion adjacent to the first end thereof and at least one primary load bearing wheel disposed to the dorsal side of the respective wing portion adjacent to the second end thereof.

11. The trolley and rail system of claim 10 wherein there are at least two primary load bearing wheels disposed to the ventral side of the respective wing portion adjacent to the first end thereof and at least two primary load bearing wheels disposed to the dorsal side of the respective wing portion adjacent to the second end thereof and further comprising a stabilizing wheel disposed to the dorsal side of each wing portions adjacent to the upper ends thereof and to the ventral side of the wing portions adjacent to the lower ends thereof.

12. The trolley and rail system of claim 6 wherein each load bearing wheel is rotatably retained in relation to the respective wing portion by an axle received into an aperture in the wing portion with a bushing interposed between the axle and the wheel wherein each bushing has a narrowed tip for being received into the aperture in the wing portion around the axle thereby to ensure a centering and precise location of the load bearing wheel.

13. The trolley and rail system of claim 6 wherein the central portion of the trolley structure has a ventrally disposed alcove therein and further comprising a means for retaining an article to be supported in relation to the alcove.

14. The trolley and rail system of claim 6 further comprising a dorsally disposed rigid spine member fixed to the first and second rails.

15. The trolley and rail system of claim 6 further comprising at least one constant force spring for assisting in a travel of the trolley structure in relation to the rail arrangement wherein the constant force spring has a body portion rotatably retained in relation to one of the rail arrangement and the trolley structure and an end portion fixed in relation to the other of the rail arrangement and the trolley structure.

16. A trolley and rail system for use in relation to an extension and retraction arrangement, the trolley and rail arrangement comprising:

a rail arrangement comprising first and second rails retained in substantially parallel spaced orientation relative to one another wherein each rail has a dorsal side, a ventral side, a first end, a second end, and a body portion with a rigid bearing surface therealong;

a trolley structure with a central portion and first and second wing portions wherein the central portion of the trolley structure has a ventrally disposed alcove therein disposed inboard of the first and second rails;

at least one load bearing wheel rotatably retained in relation to each of the first and second wing portions of the trolley structure for engaging the respective rigid bearing surfaces of the first and second rails; and a means for retaining an article to be supported in relation to the central portion of the trolley structure wherein the means for retaining an article to be supported comprises a support arm with a first end coupled to the alcove in the central portion of the trolley structure, an elongate body portion that projects beyond the alcove in the body portion of the trolley structure, and a second end spaced from the first end of the support arm.

17. The trolley and rail system of claim 16 further comprising first and second constant force springs for assisting in a travel of the trolley structure in relation to the rail arrangement wherein the first constant force spring has a body portion rotatably retained in relation to one of the first rail and the trolley structure and an end portion fixed in relation to the other of the first rail and the trolley structure and wherein the second constant force spring has a body portion rotatably retained in relation to one of the second rail and the trolley structure and an end portion fixed in relation to the other of the second rail and the trolley structure.

18. The trolley and rail system of claim 16 wherein the rigid bearing surfaces of the first and second rails and the load bearing wheels of the first and second wing portions of the trolley structure have correspondingly contoured profiles.

19. The trolley and rail system of claim 16 wherein the first and second rails each has a rigid dorsal bearing surface facing the dorsal side of the respective rail and a rigid ventral bearing surface facing the ventral side of the respective rail and wherein the trolley structure has at least one load bearing wheel disposed to engage the rigid dorsal bearing surface and at least one load bearing wheel to engage the rigid ventral bearing surface whereby the load bearing wheels can impart opposed dorsal and ventral forces on the first and second rails.

20. The trolley and rail system of claim 16 further comprising a dorsally disposed rigid spine member fixed to the first and second rails.

21. The trolley and rail system of claim 16 wherein the means for retaining a supported article includes a plurality of threaded mounting holes in accordance with the Video Electronics Standards Association Flat Display Mounting Standard for flat panel monitors.

22. The trolley and rail system of claim 21 further comprising a flat panel monitor.

\* \* \* \* \*